US008693652B2

(12) United States Patent
Clark et al.

(10) Patent No.: US 8,693,652 B2
(45) Date of Patent: Apr. 8, 2014

(54) METHOD AND SYSTEM FOR PROCESSING CALLS IN AN ARCHITECTURE ALLOWING A TELEPHONY IDENTIFIER TO BE ASSOCIATED WITH A GROUP OF IDENTITIES

(75) Inventors: David William Clark, Carp (CA); Eric John Wolf, Stittsville (CA); Yannick Lessard, Gatineau (CA); Danica Rogers, Ottawa (CA); Nathan Gerald Archer, Russell (CA); Jonathan Allan Arsenault, Orleans (CA); Luan Cao Tuong Nguyen, Nepean (CA)

(73) Assignee: BCE Inc., Verdun, Québec (CA)

( * ) Notice: Subject to any disclaimer, the term of this patent is extended or adjusted under 35 U.S.C. 154(b) by 944 days.

(21) Appl. No.: 12/674,262

(22) PCT Filed: Dec. 27, 2007

(86) PCT No.: PCT/CA2007/002363
§ 371 (c)(1),
(2), (4) Date: Feb. 19, 2010

(87) PCT Pub. No.: WO2009/082803
PCT Pub. Date: Jul. 9, 2009

(65) Prior Publication Data
US 2011/0038469 A1 Feb. 17, 2011

(51) Int. Cl.
H04M 13/00 (2006.01)
(52) U.S. Cl.
USPC ...................................... 379/177; 379/142.06
(58) Field of Classification Search
USPC .................. 379/201.01, 211.02, 142.01, 177, 379/142.06
See application file for complete search history.

(56) References Cited

U.S. PATENT DOCUMENTS 5,220,599 A 6/1993 Sasano et al.
5,276,731 A 1/1994 Arbel et al.
(Continued)

FOREIGN PATENT DOCUMENTS

CA 2533514 2/2005
EP 0569164 10/1993
(Continued)

OTHER PUBLICATIONS

International Search Report mailed on Aug. 21, 2008 in connection with International patent application PCT/CA2007/002323.
(Continued)

Primary Examiner — Simon Sing
Assistant Examiner — Simon King

(57) ABSTRACT

A system and a method for processing calls. The system comprises a database including: a plurality of telephony identifiers; and for each telephony identifier, information regarding a group of persons that is associated with the telephony identifier, each person of the group of persons being reachable by placing a call to the telephony identifier, the information comprising, for each person of the group of persons, information related to processing of calls involving the person. The system also comprises a processing element having access to the database and being operative for: determining that a given call involves a particular person of the group of persons that is associated with a given one of the telephony identifiers; and processing the given call based on the information related to processing of calls involving the particular person. Also provided is a method for associating an additional telephony identifier wish one or more identities of a group of identities that is associated with a telephony identifier, and a method for associating an additional identity with a telephony identifier that is associated with a group of identifies.

82 Claims, 6 Drawing Sheets

(56) References Cited

U.S. PATENT DOCUMENTS

| | | | |
|---|---|---|---|
| 5,299,260 A | | 3/1994 | Shaio |
| 5,329,578 A | | 7/1994 | Brennan et al. |
| 5,392,342 A | | 2/1995 | Rosenthal |
| 5,430,791 A | | 7/1995 | Feit et al. |
| 5,465,295 A | | 11/1995 | Furman |
| 5,479,496 A | * | 12/1995 | Endo et al. ............... 379/212.01 |
| 5,506,890 A | | 4/1996 | Gupta et al. |
| 5,533,107 A | | 7/1996 | Irwin et al. |
| 5,596,631 A | * | 1/1997 | Chen ............................ 379/177 |
| 5,623,537 A | * | 4/1997 | Ensor et al. .................. 379/88.2 |
| 5,764,746 A | | 6/1998 | Reichelt |
| 5,793,859 A | | 8/1998 | Matthews |
| 5,875,240 A | * | 2/1999 | Silverman ............... 379/142.07 |
| 5,987,100 A | | 11/1999 | Fortman et al. |
| 5,999,613 A | | 12/1999 | Nabkel et al. |
| 6,005,870 A | | 12/1999 | Leung et al. |
| 6,067,349 A | | 5/2000 | Suder et al. |
| 6,134,310 A | | 10/2000 | Swan et al. |
| 6,295,353 B1 | | 9/2001 | Flockhart et al. |
| 6,304,573 B1 | | 10/2001 | Hicks, III |
| 6,389,117 B1 | | 5/2002 | Gross et al. |
| 6,400,808 B1 | | 6/2002 | Burg |
| 6,438,217 B1 | | 8/2002 | Huna |
| 6,529,592 B1 | | 3/2003 | Khan |
| 6,668,055 B2 | | 12/2003 | Marwell et al. |
| 6,721,397 B1 | | 4/2004 | Lu |
| 6,728,360 B1 | | 4/2004 | Brennan |
| 6,788,778 B2 | | 9/2004 | Tatsumi |
| 6,826,271 B1 | | 11/2004 | Kanabar et al. |
| 6,829,332 B2 | | 12/2004 | Farris et al. |
| 6,898,274 B1 | | 5/2005 | Galt et al. |
| 6,961,559 B1 | | 11/2005 | Chow et al. |
| 7,162,021 B1 | | 1/2007 | Johnson et al. |
| 7,269,412 B2 | | 9/2007 | Bacon et al. |
| 7,280,646 B2 | | 10/2007 | Urban et al. |
| 7,283,512 B2 | | 10/2007 | Hall |
| 7,295,656 B2 | | 11/2007 | Ruckart |
| 7,388,949 B2 | | 6/2008 | Contractor et al. |
| 7,474,432 B1 | | 1/2009 | Kirchhoff et al. |
| 7,609,832 B2 | | 10/2009 | Kreiner et al. |
| 7,672,444 B2 | | 3/2010 | Perrella et al. |
| 8,023,632 B2 | | 9/2011 | Gruchala |
| 8,031,851 B2 | | 10/2011 | Holt et al. |
| 8,175,904 B2 | | 5/2012 | Templeton |
| 8,243,895 B2 | * | 8/2012 | Jain et al. ...................... 379/177 |
| 2002/0039407 A1 | | 4/2002 | O'Donovan et al. |
| 2002/0086662 A1 | | 7/2002 | Culliss |
| 2003/0003900 A1 | | 1/2003 | Goss et al. |
| 2003/0058839 A1 | | 3/2003 | D'Souza |
| 2003/0060210 A1 | | 3/2003 | Ravishankar et al. |
| 2004/0028026 A1 | | 2/2004 | McClung et al. |
| 2004/0095925 A1 | | 5/2004 | Cody et al. |
| 2005/0053218 A1 | | 3/2005 | Kim |
| 2005/0054335 A1 | | 3/2005 | Pearson et al. |
| 2005/0064855 A1 | | 3/2005 | Russell |
| 2005/0100155 A1 | | 5/2005 | Trinkel et al. |
| 2005/0207361 A1 | | 9/2005 | Rosenberg et al. |
| 2005/0245236 A1 | | 11/2005 | Servi et al. |
| 2006/0029195 A1 | | 2/2006 | Mullis et al. |
| 2006/0177033 A1 | | 8/2006 | Allen et al. |
| 2006/0190591 A1 | | 8/2006 | Bobde et al. |
| 2007/0111743 A1 | | 5/2007 | Leigh et al. |
| 2007/0143397 A1 | | 6/2007 | Guedalia et al. |
| 2007/0147349 A1 | | 6/2007 | Bangor et al. |
| 2007/0153991 A1 | | 7/2007 | Daigle |
| 2007/0155370 A1 | | 7/2007 | Daigle |
| 2007/0263781 A1 | | 11/2007 | Goldman et al. |
| 2007/0299927 A1 | | 12/2007 | Knauerhase |
| 2009/0055502 A1 | | 2/2009 | Agarwal et al. |
| 2009/0086720 A1 | | 4/2009 | Westlake |
| 2009/0111474 A1 | | 4/2009 | Hill et al. |
| 2009/0247188 A1 | | 10/2009 | Ridley et al. |
| 2012/0106725 A1 | | 5/2012 | Smith et al. |

FOREIGN PATENT DOCUMENTS

| | | |
|---|---|---|
| EP | 1211875 | 6/2002 |
| EP | 1583341 | 10/2005 |
| EP | 1684478 | 7/2006 |
| GB | 2387737 | 1/2006 |
| JP | 2002-016701 | 1/2002 |
| WO | 9107041 | 5/1991 |
| WO | 03041362 | 5/2003 |
| WO | 2006129296 | 12/2006 |
| WO | 2007033457 | 3/2007 |
| WO | 2007056824 | 5/2007 |
| WO | 2007071007 | 6/2007 |
| WO | W02008042990 | 4/2008 |
| WO | 2008067631 | 6/2008 |
| WO | 2008077226 | 7/2008 |

OTHER PUBLICATIONS

International Search Report mailed on Sep. 9, 2008 in connection with International patent application PCT/CA2007/002347.

Written Opinion of the International Searching Authority mailed Sep. 9, 2008 in connection with International patent application PCT/CA2007/002347.

International Search Report mailed on Sep. 9, 2008 in connection with International patent application PCT/CA2007/002279.

International Search Report mailed on Sep. 29, 2008 in connection with International patent application PCT/CA2007/002363.

International Search Report mailed on Sep. 17, 2008 in connection with International patent application PCT/CA2007/002346.

Tyson J. et al., "How VoIP Works", 2005, http://www.engedi.net/documents/HowVoIPWorks_Feb.pdf, Sep. 2008.

Written Opinion of the International Searching Authority mailed on Sep. 17, 2008 in connection with International patent application PCT/CA2007/002346.

International Search Report mailed on Sep. 19, 2008 in connection with International patent application PCT/CA2007/002364.

Written Opinion of the International Searching Authority mailed on Sep. 19, 2008 in connection with International patent application PCT/CA2007/002364.

Written Opinion of the International Searching Authority mailed Aug. 21, 2008 in connection with International patent application PCT/CA2007/002323.

Written Opinion of the International Searching Authority mailed Sep. 9, 2008 in connection with International patent application PCT/CA2007/002279.

Written Opinion of the International Searching Authority mailed Sep. 29, 2008 in connection with International patent application PCT/CA2007/002363.

Written Opinion of the International Searching Authority mailed on Sep. 24, 2008 in connection with International patent application PCT/CA2007/2365.

International Search Report mailed on Sep. 24, 2008 in connection with International patent application PCT/CA2007/2365.

Office Action issued on Feb. 8, 2013 in connection with U.S. Appl. No. 12/809,711, 41 pages.

Office Action issued on Jan. 4, 2013 in connection with U.S. Appl. No. 12/809,407, 31 pages.

International Preliminary Report on Patentability completed on Mar. 10, 2010 in connection with International Patent Application PCT/CA2007/002362, 7 pages.

Nunn, A., "Voice Evolution", BT Technology Journal, Kluwer Academic Publishers, DO, vol. 23, No. 1, Jan. 1, 2005, pp. 120-133, XP019218795, ISSN: 1573-1995, DOI: DOI: 10.1007/S10550-005-0113-3.

Extended European Search Report completed on Nov. 26, 2010 in connection with European Patent Application 07 85 5626, 4 pages.

Office Action issued on Mar. 15, 2012 in connection with U.S. Appl. No. 12/809,806, 9 pages.

Examiner's Report issued on Jun. 4, 2012 in connection with Canadian Patent Application 2,647,920, 2 pages.

Office Action issued on May 25, 2012 in connection with U.S. Appl. 12/673,233, 9 pages.

(56) References Cited

OTHER PUBLICATIONS

Supplementary European Search Report issued on May 22, 2012, in connection with European Patent Application 07855561, 6 pages.
Supplementary European Search Report completed on Nov. 26, 2010 in connection with European Patent Application 07 855 626, 4 pages.
Supplementary European Search Report completed on Sep. 30, 2011 in connection with European Patent 07 855 645, 7 pages.
Office Action issued on Aug. 31, 2012 in connection with U.S. Appl. No. 12/809,711, 30 pages.
Office Action issued on Sep. 10, 2012 in connection with U.S. Appl. No. 12/809,806, 15 pages.
Office Action issued on Oct. 5, 2012 in connection with U.S. Appl. No. 12/643,010, 9 pages.
Office Action issued on Oct. 15, 2012 in connection with U.S. Appl. No. 12/673,233, 12 pages.
Office Action issued on Nov. 8, 2012 in connection with U.S. Appl. No. 12/745,352, 22 pages.
Examiner's Report issued on Aug. 12, 2013 in connection with Canadian Patent Application 2,710,245, 7 pages.
One Voice Technologies, "Send E-mail. Voice-to-Text Messaging Solution", retrieved at www.onev.com/solutions/mobile_send.asp on Dec. 18, 2009, 2 pages.
Google, "Google voice", retrieved at http://www.google.com/googlevoice/about.html, on Dec. 18, 2009, 1 page.
Office Action issued on Aug. 23, 2013 in connection with U.S. Appl. No. 12/809,711—45 pages.
Office Action issued on Aug. 15, 2013 in connection with U.S. Appl. No. 12/673,233—11 pages.
Office Action issued on Jul. 19, 2013 in connection with U.S. Appl. No. 12/745,352, 22 pages.
Office Action issued on Jun. 18, 2013 in connection with U.S. Appl. No. 12/743,325, 9 pages.
Notice of Allowance issued on Nov. 5, 2013 in connection with U.S. Appl. No. 12/809,711, 13 pages.

* cited by examiner

METHOD AND SYSTEM FOR PROCESSING CALLS IN AN ARCHITECTURE ALLOWING A TELEPHONY IDENTIFIER TO BE ASSOCIATED WITH A GROUP OF IDENTITIES

FIELD OF THE INVENTION

The present invention relates generally to telecommunications and, more particularly, to a method and a system for processing calls in an architecture allowing a telephone number or other telephony identifier to be associated with a group of identities.

BACKGROUND

People nowadays typically rely on various communication devices to meet their communication needs. For example, it is not uncommon for an individual to use a wired phone at home and another wired phone at work, while carrying around a wireless phone for mobile communication. While certainly facilitating communications, this reliance on various communication devices has some drawbacks.

For instance, in addition to receiving different bills for use of different communication devices (e.g., one bill for a home's wired phone and another bill for a wireless phone), it can become inconvenient and inefficient for an individual to give out different telephone numbers (e.g., a telephone number of the home's wired phone and a telephone number of the wireless phone) to friends, business contacts or other acquaintances, who must then inconveniently keep track of these different telephone numbers at which the individual can be reached.

Compounding this is that, on top of using various communication devices, different people in a household or other social unit typically have vastly different social networks. Not only can this give rise to a billing chaos, but the different people, communication devices and social networks can result in incoming calls and outgoing calls being inefficiently handled. For example, in a household with parents and children, the parents may frequently answer calls that are intended for their children, which in some cases may prove quite frustrating for the parents who may unnecessarily be distracted and/or waste time.

For these and various other reasons, there exists a need for solutions enabling more efficient processing of calls, particularly in households or other social units with multiple individuals and/or multiple communication devices.

SUMMARY OF THE INVENTION

As embodied and broadly described herein, the present invention provides a system for processing calls. The system comprises a database including: a plurality of telephony identifiers; and for each telephony identifier, information regarding a group of persons that is associated with the telephony identifier, each person of the group of persons being reachable by placing a call to the telephony identifier, the information comprising, for each person of the group of persons, information related to processing of calls involving the person. The system also comprises a processing element having access to the database and being operative for: determining that a given call involves a particular person of the group of persons that is associated with a given one of the telephony identifiers; and processing the given call based on the information related to processing of calls involving the particular person.

The present invention also provides a method for processing calls. The method comprises maintaining a database including: a plurality of telephony identifiers; and for each telephony identifier, information regarding a group of persons that is associated with the telephony identifier, each person of the group of persons being reachable by placing a call to the telephony identifier, the information comprising, for each person of the group of persons, information related to processing of calls involving the person. The method also comprises: determining that a given call involves a particular person of the group of persons that is associated with a given one of the telephony identifiers; and processing the given call based on the information related to processing of calls involving the particular person.

The present invention also provides at least one data storage medium storing a database for use in processing calls. The database includes: a plurality of telephony identifiers; and for each telephony identifier, information regarding a group of persons that is associated with the telephony identifier, each person of the group of persons being reachable by placing a call to the telephony identifier, the information comprising, for each person of the group of persons, information related to processing of calls involving the person.

The present invention also provides a system for processing calls. The system comprises a database including: a plurality of telephony identifiers; and for each telephony identifier, information regarding a group of identities that is associated with the telephony identifier, each identity of the group of identities designating a party reachable by placing a call to the telephony identifier, the information comprising, for each identity of the group of identities, information related to processing of calls involving the identity. The system also comprises a processing element having access to the database and being operative for: determining that a given call involves a particular identity of the group of identities that is associated with a given one of the telephony identifiers; and processing the given call based on the information related to processing of calls involving the particular identity.

The present invention also provides a method for processing calls. The method comprises maintaining a database including: a plurality of telephony identifiers; and for each telephony identifier, information regarding a group of identities that is associated with the telephony identifier, each identity of the group of identities designating a party reachable by placing a call to the telephony identifier, the information comprising, for each identity of the group of identities, information related to processing of calls involving the identity. The method also comprises: determining that a given call involves a particular identity of the group of identities that is associated with a given one of the telephony identifiers; and processing the given call based on the information related to processing of calls involving the particular identity.

The present invention also provides at least one data storage medium storing a database for use in processing calls. The database includes: a plurality of telephony identifiers; and for each telephony identifier, information regarding a group of identities that is associated with the telephony identifier, each identity of the group of identities designating a party reachable by placing a call to the telephony identifier, the information comprising, for each identity of the group of identities, information related to processing of calls involving the identity.

The present invention also provides a method for use in call processing. The method comprises maintaining a database comprising: a plurality of telephony identifiers; and for each telephony identifier, information regarding a group of identities that is associated with the telephony identifier, each identity of the group of identities designating a party reachable by placing a call to the telephony identifier, the information comprising, for each identity of the group of identities, information related to processing of calls involving the identity. The method also comprises: determining that an additional identity is to be associated with a given one of the telephony identifiers such that a party designated by the additional identity becomes reachable by placing a call to the given one of the telephony identifiers; and associating in the database the additional identity with the given one of the telephony identifiers such that the database comprises information related to processing of calls involving the additional identity.

The present invention also provides a method for use in call processing. The method comprises maintaining a database comprising: a plurality of telephony identifiers; and for each telephony identifier, information regarding a group of identities that is associated with the telephony identifier, each identity of the group of identities designating a party reachable by placing a call to the telephony identifier, the information comprising, for each identity of the group of identities, information related to processing of calls involving the identity. The method also comprises: determining that an additional telephony identifier is to be associated with a particular identity of the group of identities that is associated with a given one of the telephony identifiers; and associating in the database the additional telephony identifier with the particular identity such that the party designated by the particular identity is reachable by placing a call to either the additional telephony identifier or the given one of the telephony identifiers.

These and other aspects of the invention will become apparent to those of ordinary skill in the art upon review of the following description of example embodiments of the invention in conjunction with the accompanying drawings.

BRIEF DESCRIPTION OF THE DRAWINGS

A detailed description of certain embodiments of the present invention is provided herein below, by way of example only, with reference to the accompanying drawings, in which.

It is to be expressly understood that the description and drawings are only for the purpose of illustration of example embodiments of the invention and are an aid for understanding. They are not intended to be a definition of the limits of the invention.

DETAILED DESCRIPTION OF EMBODIMENTS

Figure 1:
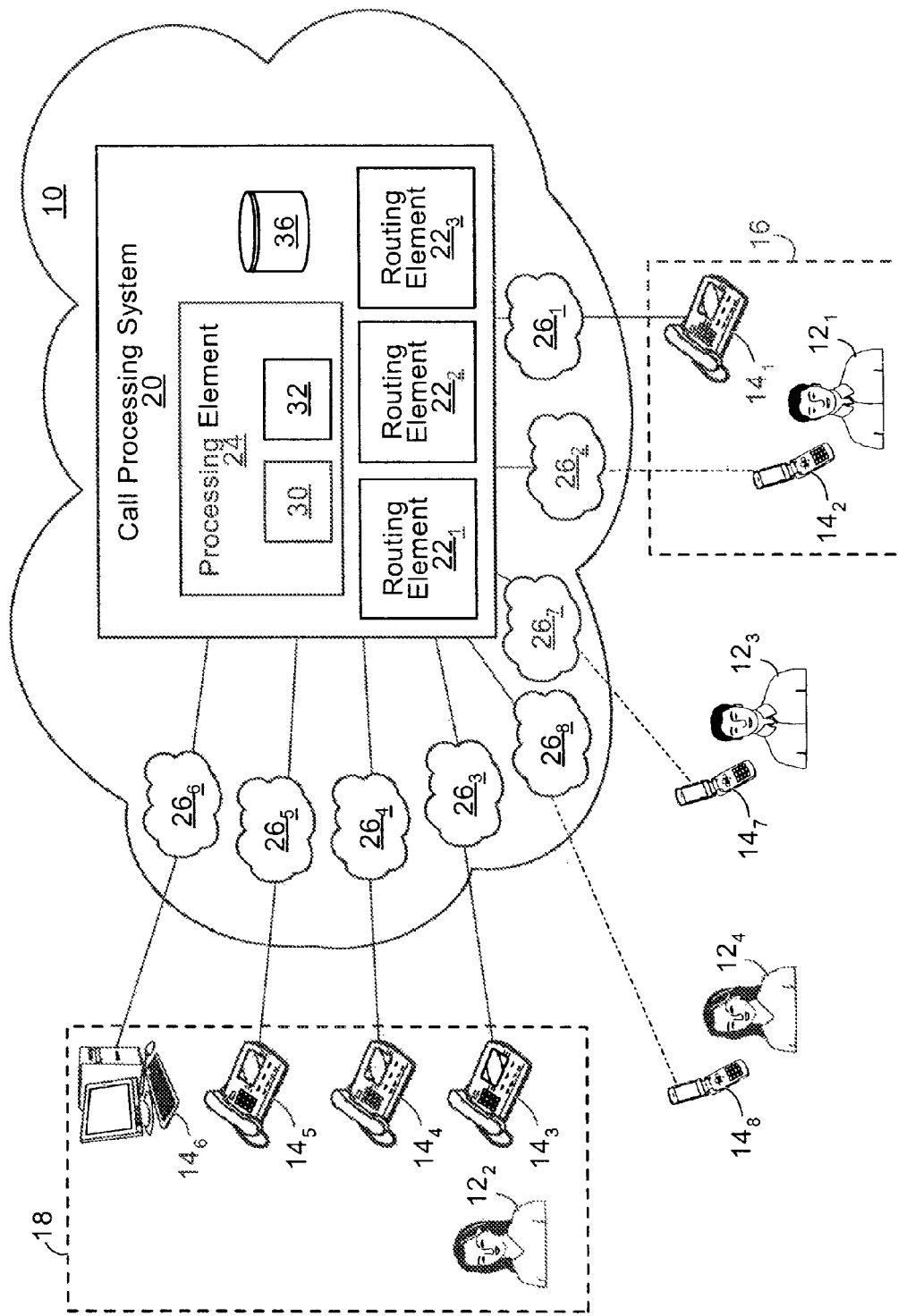
FIG. 1 shows a communications network allowing users of communication devices to effect telephonic communications, the communications network comprising a call processing system in accordance with an embodiment of the invention.

FIG. 1 shows a communications network 10 allowing users of communication devices, including users $12_1 \ldots 12_4$ of communication devices $14_1 \ldots 14_8$, to effect telephonic communications (e.g., receive and originate calls). The communications network 10 may comprise a portion of one or more of the Public Switched Telephone Network (PSTN), a wireless network (e.g., a cellular network), and a data network (e.g., the Internet).

Various types of communication devices may be used by users to effect telephonic communications. For example, in various embodiments, a communication device used by a user (such as any one of the communication devices $14_1 \ldots 14_8$) may be a wired Plain Old Telephony System (POTS) phone (including a cordless phone), a wireless phone (e.g., a cellular phone or other mobile communication device, including a telephony-enabled personal digital assistant (PDA)), a Voice-over-Internet Protocol (VoIP) phone, a POTS phone equipped with an analog terminal adapter (ATA), a softphone (i.e., a computer equipped with telephony software), or a telephony-enabled television unit (e.g., a set-top box connected to a television and a remote control). Depending on functionality of a given communication device (such as any one of the communication devices $14_1 \ldots 14_8$), a call originated or received by the given communication device may be a voice call, a video call, a multimedia call, or any other type of call. Also, depending on its functionality, a given communication device (such as any one of the communication devices $14_1 \ldots 14_8$) may allow other communications to be effected (e.g., send and receive text, multimedia, email and/or instant messaging (IM) messages).

In this embodiment, the users $12_1 \ldots 12_4$ are members of a family. More particularly, in this example, the users $12_1$ and $12_2$ are parents, respectively father and mother, and the users $12_3$ and $12_4$ are their children, in this case, son and daughter, respectively. Also, in this embodiment: the communication device $14_1$ is a POTS phone located at a workplace 16 of the user $12_1$; the communication device $14_2$ is a wireless phone carried by the user $12_1$; the communication devices $14_3 \ldots 14_6$ are located at a residence 18 (e.g., a house) of the users $12_1 \ldots 12_4$, with the communication device 143 being a VoIP phone located in a common area (e.g., a kitchen or living room) of the residence 18, the communication device $14_4$ being an ATA-equipped POTS phone located in a bedroom of the users $12_1$ and $12_2$, the communication device $14_5$ being a VoIP phone located in a bedroom of the user $12_3$, and the communication device $14_6$ being a softphone located in a bedroom of the user $12_4$; the communication device $14_7$ is a wireless phone carried by the user $12_3$; and the communication device $14_8$ is a wireless phone carried by the user $12_4$.

It will be appreciated that, while in this embodiment the communication devices $14_1 \ldots 14_8$ are certain types of devices that are associated in a particular manner with the users $12_1 \ldots 12_4$, in other embodiments, the communication devices $14_1 \ldots 14_8$ may be other types of devices and may be associated in other manners with the users $12_1 \ldots 12_4$. It will also be appreciated that this embodiment where the users $12_1 \ldots 12_4$ are family members is presented for illustrative purposes only and that, in other embodiments, various users of communication devices may have various different affiliations or no particular affiliation.

The communication devices $14_1 \ldots 14_8$ are connected to a call processing system 20 via various network portions of the communications network 10. The call processing system 20 is operative to effect various call processing operations when a communication device (such as any one of the communication devices $14_1 \ldots 14_8$) is destined to receive an incoming call or is used to originate an outgoing call or participate in a call in progress. The call processing system 20 comprises suitable hardware, firmware, software or a combination thereof for implementing a plurality of functional elements, including a processing element 24 and a plurality of routing elements $22_1 \ldots 22_3$, whose functions are discussed below.

More particularly, in this embodiment;

The communication device $14_1$ (in this case, a wired POTS phone) is connected to the routing element $22_1$ of the call processing system 20 via a network portion $26_1$ of the communications network 10. The network portion $26_1$ may comprise a telephone line in the PSTN and possibly one or more other network components (e.g., routing elements, gateways, etc.). The routing element $22_1$ is operative to perform operations to cause establishment of a call destined for or originated by the communication device $14_1$. For example, the routing element $22_1$ may be implemented by a central office telephone switch.

The communication device $14_2$ (in this case, a wireless phone) is connected to the routing element $22_2$ of the call processing system 20 via a network portion $26_2$ of the communications network 10. The network portion $26_2$ may comprise a wireless link in combination with a base station and a wireline link, and possibly one or more other network components (e.g., routing elements, gateways, etc.). The routing element $22_2$ is operative to perform operations to cause establishment of a call destined for or originated by the communication device $14_2$. For example, the routing element $22_2$ may be implemented by a mobile switching center.

Similarly, the communication devices $14_7$ and $14_8$ (in this case, wireless phones) are connected to the routing element $22_2$ of the call processing system 20 via network portions $26_7$ and $26_8$ of the communications network 10. Each of the network portions $26_7$ and $26_8$ may comprise a wireless link in combination with a base station and a wireline link, and possibly one or more other network components (e.g., routing elements, gateways, etc.). The routing element $22_2$ is operative to perform operations to cause establishment of a call destined for or originated by any of the communication devices $14_7$ and $14_8$. It will be appreciated that, in other embodiments, the communication devices $14_7$ and $14_8$ may be connected to one or more other routing elements of the call processing system 20 (e.g., where the wireless phones $14_2$, $14_7$ and $14_8$ are serviced by different service providers which may operate different routing elements).

The communication devices $14_3 \ldots 14_6$ (each of which is, in this case, a VoIP phone, ATA-equipped POTS phone or softphone) are connected to the routing element $22_3$ of the call processing system 20 via network portions $26_3 \ldots 26_6$ of the communications network 10. Each of the network portions $26_3 \ldots 26_6$ may comprise a digital communications link (e.g., a digital subscriber line (DSL) link, a cable link, or a wireless data link such as a WiMAX link) and possibly one or more other network components (e.g., routing elements, gateways, etc.). While they are shown as distinct from one another in FIG. 1, it will be appreciated that some or all of the network portions $26_3 \ldots 26_6$ may be implemented as a common network portion that branches off at the residence 18. For instance, in some cases, certain ones of the communication devices $14_3 \ldots 14_6$ (e.g., the communication devices $14_3$, $14_5$ and $14_6$) may be connected to a local router at the residence 18.

The routing element $22_3$ is operative to perform operations to cause establishment of a call destined for or originated by any of the communication device $14_3 \ldots 14_6$. For example, the routing element $22_3$ may be implemented by a softswitch, a router (e.g., an edge router or a core router), or a server equipped with a modem. It will be appreciated that, in other embodiments, some of the communication devices $14_3 \ldots 14_6$ may be connected to one or more other routing elements of the call processing system 20 (e.g., where two or more of the communication devices $14_3 \ldots 14_6$ are serviced by different service providers which may operate different routing elements).

It will be appreciated that each of the network portion $26_1 \ldots 26_8$ may span across different networks (e.g., PSTN, wireless, and/or data networks) in which case it may comprise one or more gateways enabling communication and interoperability between these networks. Such gateways are well known and need not be described in further detail.

If will also be appreciated that, while in this embodiment the communication devices $14_1 \ldots 14_8$ are connected to the call processing system 20 in a certain manner, communication devices such as the communication devices $14_1 \ldots 14_8$ may be connected to the call processing system 20 in various other manners in other embodiments.

With continued reference to FIG. 1, in this embodiment, the call processing system 20 is operated by a service provider that provides communication services to various users of communication devices (including, in this case, the users $12_1 \ldots 12_4$). It will be recognized however that, in other embodiments, different functional elements of the call processing system 20 may be operated by different service providers.

In some embodiments, two or more of the processing element 24 and the routing elements $22_1 \ldots 22_3$ of the call processing system 20 may be functional elements implemented by a common network component. In particular, the processing element 24 and one or more of the routing elements $22_1 \ldots 22_3$ may be implemented by a common network component. For example, in some embodiments, the processing element 24 and the routing element $22_3$ may be functional elements of a softswitch or other server.

Also, in some embodiments, two or more of the processing element 24 and the routing elements $22_1 \ldots 22_3$ of the call processing system 20 may be functional elements implemented by different network components that are linked by one or more physical (i.e., wired or wireless) communication links and possibly other network components (e.g., gateways) of the communications network 10. For example, in some embodiments, the processing element 24 and the routing element $22_3$ may be functional elements of a softswitch or other server, while the routing element $22_1$ is a functional element of a central office telephone switch and the routing element $22_2$ is a functional element of a mobile switching center, whereby the central office telephone switch and the mobile switching center are linked to the Softswitch or other server via communication links and possibly other network components of the communications network 10.

The processing element 24 comprises suitable hardware, firmware, software or a combination thereof for implementing a plurality of functional entities, including a processing entity 30 and a routing entity 32, which are configured to perform various operations when a communication device (such as any one of the communication devices $14_1 \ldots 14_8$) is destined to receive an incoming call or is used to originate an outgoing call or participate in a call in progress.

More particularly, the processing entity 30 implements a call processing logic to process a call destined for, originated by, or in progress at a communication device (such as any one of the communication devices $14_1 \ldots 14_8$). For example, the call processing logic may be defined by a sequence of decisions to be taken with respect to a given call, which may lead to one or more actions being performed based on those decisions.

Each decision taken with respect to a given call may be based on one or more factors. A factor on which is based a decision to be taken with respect to a given call may be defined in terms of information regarding the given call. For example, information regarding a given call may include information regarding an origin of the given call such as: the given call's origin which may be expressed, for instance, as a telephone number or other identifier (e.g., an Internet Protocol (IP) address or another Uniform Resource Identifier (URI) such as a Session Initiation Protocol (SIP) URI) identifying a device that originated the given call or as a name or other identifier of a calling party that originated the call; a time at which the given call was originated (e.g., a day, hour, minute, etc.); and/or a location (e.g., a city or street address) where the given call was originated. As another example, information regarding a given call may include information regarding a destination of the given call as specified by a calling party that originated the call, such as the given call's intended destination, which may be expressed, for instance, as a telephone number or other identifier (e.g., an IP address or SIP URI) identifying a device for which the call is destined or as a name or other identifier of a called party for which the call is destined. A factor on which is based a decision to be taken with respect to a given call may also be defined in terms of certain information included in a database 36 that may be accessed by the processing entity 30.

One or more actions are performed based on one or more decisions taken with respect to a given call, such as route the given call to a certain destination, cause a distinctive ringing to be effected to announce the given call, block the given call, etc. The routing entity 32 is operative to cause these one or more actions to be performed. For example, for a given call destined for, originated by, or in progress at one of the communication devices $14_1 \ldots 14_8$, the routing entity 32 may cause a given one of the routing elements $22_1 \ldots 22_3$ to perform these one or more actions.

In accordance with an embodiment of the present invention, a telephone number or other telephony identifier enabling establishment of calls may be associated with a group of "identities", where each "identity" designates a party reachable by placing a call to this telephone number or other telephony identifier. The party designated by an identity may be a person or a group of persons. Also, in some cases, a person may have a plurality of identities (e.g., a personal identity for his/her personal life and a business identity for business purposes).

As further discussed below, this association of a telephone number or other telephony identifier with a group of identities is particularly useful from various perspectives. For example, this may allow multiple persons and/or multiple communication devices to share a common telephone number or other telephony identifier, and have an incoming call placed to that telephone number or other telephony identifier routed according to which identity it is determined to be intended for and/or have an outgoing call placed by any of these persons using any of these communication devices processed according to which identity it is determined to be originated by. In addition, a single consolidated bill may be issued by the service provider operating the call processing system 20 for charges incurred by these multiple persons and/or multiple communication devices, thereby simplifying a billing process for both the service provider and a subscriber receiving this single consolidated bill.

Figure 2:
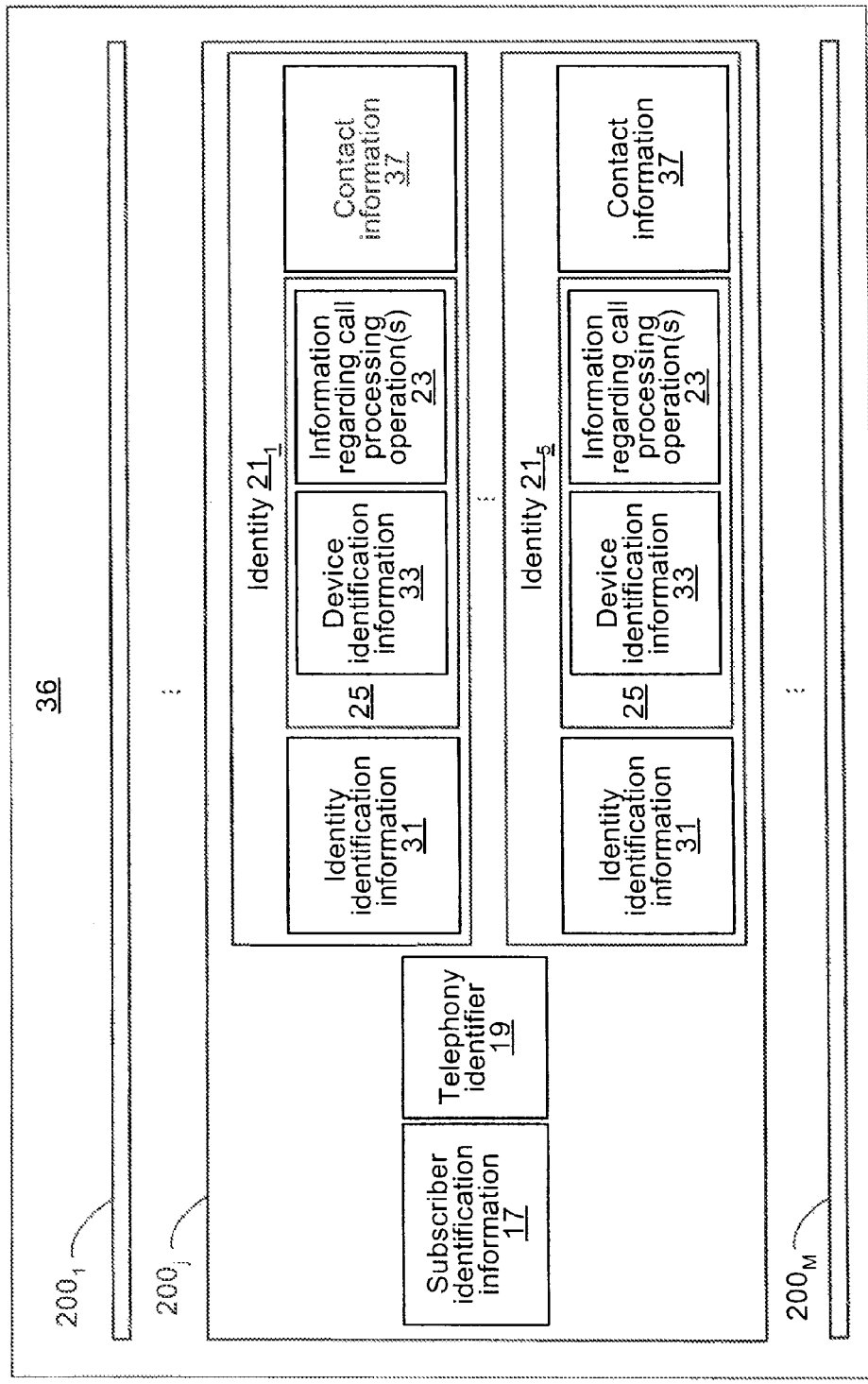
FIG. 2 shows an example of potential contents of a database of the call processing system, where a telephony identifier is associated with a group of identities that designate the users.

An association of a telephone number or other telephony identifier with a group of identities may be maintained in the database 36. FIG. 2 shows an example of potential contents of the database 36. In this example, the database 36 stores a plurality of records $200_1\text{-}200_M$, where each of the records $200_1\text{-}200_M$ is associated with a subscriber to communication services provided by the service provider operating the call processing system 20.

For purposes of illustration, it is assumed that, in this example, a record $200_j$ of the records $200_1\text{-}200_M$ is associated with the family formed by the users $12_1 \ldots 12_4$.

In this embodiment, the record $200_j$ includes subscriber identification information 17 identifying the subscriber associated with the record $200_j$. For instance, the subscriber identification information 17 may include an account number and/or another subscriber identifier.

The record $200_j$ also includes a telephony identifier 19 enabling establishment of calls. In this embodiment, the telephony identifier 19 is a telephone number, which, for purposes of this example, is assumed to be (555) 555-1234. In other embodiments, the telephony identifier 19 may be any other information that can be provided by a calling party and/or used by the communications network 10 when a call is to be established (e.g., a name, an electronic serial number (ESN), an IP address, a SIP URI, Electronic Numbering (ENUM) information, etc.).

In this example, the telephone number 19 is associated with a group of identities $21_1 \ldots 21_5$. In this case, each of the identities $21_1 \ldots 21_5$ designates a person, namely, one of the users $12_1 \ldots 12_4$. More particularly, in this example: each of the identities $21_1$ and $21_2$ designates the user $12_1$ (i.e., the father), where the identity $21_1$ is a personal identity of the user $12_1$ used for his personal life and the identity $21_2$ is a business identity of the user $12_1$ used for business purposes; the identity $21_3$ designates the user $12_2$ (i.e., the mother); the identity $21_4$ designates the user $12_3$ (i.e., the son); and the identity $21_5$ designates the user $12_4$ (i.e., the daughter).

As further discussed later on, when it operates to establish a call placed to the telephone number 19 (in this case, (555) 555-1234) by a calling party, the call processing system 20 may determine, based on information regarding an origin of the call (e.g., a telephone number or other identifier of the calling party, a time at which the call was originated, a location where the call was originated, etc.), to which of the identities $21_1 \ldots 21_5$ the call is intended for and may proceed to route the call accordingly, for instance, by directing the call to one or more of the communication devices $14_1 \ldots 14_8$. Similarly, when it operates to establish a call originated by any of the users $12_1 \ldots 12_4$ using any of the communication devices $14_1 \ldots 14_8$, the call processing system 20 may process the call according to which of the identities $21_1 \ldots 21_5$ it is determined to be originated by.

Each of the identities $21_1 \ldots 21_5$ is associated with various information that effectively serves to define that identity within the call processing system 20.

More particularly, in this embodiment, each of the identities $21_1 \ldots 21_5$ is identified by identity identification information 31, which may include, for instance, a name (e.g., a name of a given one of the users $12_1 \ldots 12_4$ designated by that identity), an identity number or code, and/or other information identifying that identity.

Also, each of the identities $21_1 \ldots 21_5$ is associated with information 25 related to processing of calls involving that identity, i.e., calls intended for or originated by the person designated by that identity. The information 25 associated with each of the identities $21_1 \ldots 21_5$, which is hereinafter referred to as "call processing information", is used by the call processing system 20 to process a call intended for or originated by that identity.

In this embodiment, the call processing information 25 associated with each of the identities $21_1 \ldots 21_5$ comprises device identification information 33 directly or indirectly identifying one or more of the communication devices $14_1 \ldots 14_8$ associated with that identity. More particularly, the person designated by each of the identities $21_1 \ldots 21_5$ may be associated with one or more of the communication devices $14_1 \ldots 14_8$ that he/she is expected to use for effecting calls. Thus, in this example: the identity $21_1$ (which designates the user $12_1$, and more specifically, his personal identity) is associated with the communication devices $14_1 \ldots 14_4$; the identity $21_2$ (which designates the user $12_1$, and more specifically, his business identity) is associated with the communication devices $14_1$ and $14_2$; the identity $21_3$ (which designates the user $12_2$) is associated with the communication devices $14_3$ and $14_4$; the identity $21_4$ (which designates the user $12_3$) is associated with the communication devices $14_3$, $14_5$ and $14_7$; and the identity $21_5$ (which designates the user $12_4$) is associated with the communication devices $14_3$, $14_6$ and $14_8$.

In order to reach or be reached by the call processing system 20 over the communications network 10, each of the communication devices $14_1 \ldots 14_8$ is directly or indirectly identified by a device identifier included in the device identification information 33. The device identifier identifying each of the communication devices $14_1 \ldots 14_8$ may take on various forms depending on that communication device's type. For example: for the communication device $14_1$, which, in this case, is a wired POTS phone, the device identifier may include a telephone number identifying a telephone line to which the wired POTS phone $14_1$ is connected; for the communication device $14_2$, which, in this case, is a wireless phone, the device identifier may include an electronic serial number (ESN) and/or a telephone number associated with the wireless phone $14_2$; for each of the communication devices $14_3 \ldots 14_6$, each of which is, in this case, a VoIP phone, ATA-equipped POTS phone, or softphone, the device identifier may include an IP address and/or a telephone number (and/or another URI such as a SIP URI) associated with the VoIP phone, ATA-equipped POTS phone, or softphone. It will be recognized that the device identifier identifying a given communication device may take on other forms (e.g., Electronic Numbering (ENUM) information) in other cases.

In this example, callers who desire to reach the users $12_1 \ldots 12_4$ can do so by placing calls to the telephone number 19 (in this case, (555) 555-1234) without knowing the device identifier associated with any of the communication devices $14_1 \ldots 14_8$. In that sense, the device identifier associated with each of the communication devices $14_1 \ldots 14_8$ can be viewed as a "hidden" identifier (e.g., a hidden telephone number) that is used by the call processing system 20 to communicate with that communication device. That is, the device identifier associated with each of the communication devices $14_1 \ldots 14_8$ need not be known by callers that call the users $12_1 \ldots 12_4$ or even by the users $12_1 \ldots 12_4$ themselves. Rather, the users $12_1 \ldots 12_4$ may provide only the telephone number 19, in this case, (555) 555-1234, to individuals (e.g., friends, colleagues, business contacts or other acquaintances) who may then proceed to call any one of the users $12_1 \ldots 12_4$ using that telephone number. As further discussed later on, the call processing system 20 can determine, based on information regarding an origin of a given call placed to the telephone number (555) 555-1234, to which of the identities $21_1 \ldots 21_5$ the call is intended for and can then proceed to route the call accordingly, for instance, by directing the call to one or more of the communication devices $14_1 \ldots 14_8$ using the (hidden) device identifier associated with each of these communication devices.

In this embodiment, the call processing information 25 associated with each of the identities $21_1 \ldots 21_5$ also comprises information 23 regarding one or more operations to be performed by the call processing system 20 to process calls intended for or originated by that identity. This information 23, which is hereinafter referred to as "processing operation information", can take on many forms in various embodiments. For example, in some embodiments, the processing operation information 23 associated with each of the identities $21_1 \ldots 21_5$ can be viewed as defining a set of one or more rules that may be characterized by various levels of complexity. For instance, in some cases, the processing operation information 23 associated with a given one of the identities $21_1 \ldots 21_5$ may simply specify to route a call determined to be intended for that identity to one or more communication devices (e.g., any one of the communication devices $14_1 \ldots 14_8$), while, in other cases, it may specify a more complex set of rules to be applied when a call is determined to be intended for or originated by that identity (e.g., based on an origin of the call, a time at which it is originated, etc.).

The processing operation information 23 associated with each of the identities $21_1 \ldots 21_5$ may be configurable in order to allow processing of calls intended for or originated by the person designated by that identity as desired by that person. In some embodiments, the processing operation information 23 associated with each of the identities $21_1 \ldots 21_5$ may be configured by the person designated by that identity during a provisioning phase (e.g., via a data network site operated by the service provider operating the call processing system 20).

For instance, in some embodiments, the processing operation information 23 associated with each of the identities $21_1 \ldots 21_5$ may relate to zero or more telephony features that may be subscribed to by the person designated by that identity. Subscription to different telephony features may be completely independent from one person to another and there is no restriction on a number or combination of features that may be subscribed to by any one person. In some cases, a person may not subscribe to any telephony feature, while in other cases a person may subscribe to all available telephony features. Also, in some cases, one or more telephony features may be subscribed to without having to pay for these one or more features, which may be provided as default or standard features.

Examples of telephony features that may be subscribed to by the person designated by an identity $21_j$ of the identities $21_1 \ldots 21_5$ ($1 \leq j \leq 5$) include:

- a call forwarding feature whereby every incoming call determined to be intended for the identity $21_1$ is to be forwarded to a particular communication device (e.g., any one of the communication devices $14_1 \ldots 14_8$) associated with a particular device identifier (e.g., a telephone number, IP address, or SIP URI), in which case the processing operation information 23 may include the particular device identifier and possibly other information (e.g., one or more periods of time during which this feature is to be applied);
- a selective call forwarding feature whereby an incoming call determined to be intended for the identity $21_j$ and originated by any of one or more communication devices each associated with a predetermined identifier (e.g., a predetermined telephone number, IP address, or SIP URI) is to be forwarded to a particular communication device (e.g., any one of the communication devices $14_1 \ldots 14_8$) associated with a particular device identifier (e.g., a telephone number, IP address, or SIP URI), in which case the processing operation information 23 may include the predetermined identifier associated with each of the one or more communication devices, the particular device identifier and possibly other information (e.g., one or more periods of time during which this feature is to be applied);

a no-answer call forwarding feature whereby an incoming call determined to be intended for the identity $21_j$ is to be forwarded to a particular communication device (e.g., any one of the communication devices $14_1 \ldots 14_8$) associated with a particular device identifier (e.g., a telephone number, IP address, or SIP URI) if it is not answered within a predetermined period of time (e.g., a predetermined number of rings), in which case the processing operation information 23 may include the particular device identifier, the predetermined period of time, and possibly other information (e.g., one or more periods of time during which this feature is to be applied);

a "find me/follow me" (FM/FM) call forwarding feature whereby an incoming call determined to be intended for the identity $21_j$ is to be forwarded to a plurality of communication devices (e.g., plural ones of the communication devices $14_1 \ldots 14_8$) respectively associated with a plurality of identifiers (each of which may be, for example, a telephone number, IP address, or SIP URI) either simultaneously and/or sequentially (e.g., until it is answered or all the identifiers have been used and the call remains unanswered, in which case it can be forwarded to a voicemail system), in which case the processing operation information 23 may include the plurality of identifiers, a sequence in which they are to be used or an indication to use all or some of them simultaneously, and possibly other information (e.g., one or more periods of time during which this feature is to be applied, one or more identifiers associated with one or more communication devices originating calls to which this feature is to be applied, etc.);

a distinctive ringing feature whereby incoming calls determined to be intended for the identity $21_j$ are to be announced by different audio signals (e.g., ring tones or songs) when they originate from communication devices associated with specific identifiers (each of which may be, for example, a telephone number, IP address, or SIP URI), in which case the processing operation information 23 may include, for each of the communication devices, the specific identifier associated therewith, information regarding a specific audio signal to be produced when an incoming call originates therefrom, and possibly other information (e.g., one or more periods of time during which this feature is to be applied);

a selective call rejection feature whereby an incoming call determined to be intended for the identity $21_j$ and originated by any of one or more communication devices each associated with a predetermined identifier (e.g., a predetermined telephone number, IP address, or SIP URI) is rejected and not announced, in which case the processing operation information 23 may include the predetermined identifier associated with each of the one or more communication devices and possibly other information (e.g., one or more periods of time during which this feature is to be applied);

a selective call acceptance feature whereby only an incoming call determined to be intended for the identity $21_j$ and originated by any of one or more communication devices each associated with a predetermined identifier (e.g., a predetermined telephone number, IP address, or SIP URI) is accepted and announced, in which case the processing operation information 23 may include the predetermined identifier associated with each of the one or more communication devices and possibly other information (e.g., one or more periods of time during which this feature is to be applied);

a call waiting feature whereby a communication device (e.g., any one of the communication devices $14_1 \ldots 14_8$) involved in a call in progress produces a notification of an incoming call determined to be intended for the identity $21_j$, in which case the processing operation information 23 may include an indication that this feature is to be applied, information regarding an audio notification to be produced to announce an incoming call, and possibly other information (e.g., one or more periods of time during which this feature is to be applied);

a distinctive ringing call waiting feature whereby a communication device (e.g., any one of the communication devices $14_1 \ldots 14_8$) involved in a call in progress produces a distinctive audio notification of an incoming call determined to be intended for the identity $21_j$ and originated by any of one or more communication devices each associated with a specific identifier (e.g., a specific telephone number. IP address, or SIP URI), in which case the processing operation information 23 may include, for each of the one or more communication devices, the specific identifier associated therewith, information regarding an audio notification to be produced to announce an incoming call originated therefrom, and possibly other information (e.g., one or more periods of time during which this feature is to be applied);

a calling line identification (CLID) displaying feature whereby CLID information (e.g., a telephone number and/or a name) associated with a communication device originating a call determined to be intended for the identity $21_j$ is displayed, in which case the processing operation information 23 may include an indication that this feature is to be applied and possibly other information (e.g., one or more periods of time during which this feature is to be applied);

a CLID blocking feature whereby CLID information (e.g., a telephone number and/or a name) is not provided to a communication device when an outgoing call for that communication device is determined to be originated by the identity $21_j$, in which case the processing operation information 23 may include an indication that this feature is to be applied and possibly other information (e.g., one or more periods of time during which this feature is to be applied);

a speed calling feature whereby an outgoing call determined to be originated by the identity $21_j$ and destined for any of one or more communication devices each associated with a predetermined telephone number can be originated by inputting a specific code (e.g., a one or two digit code) shorter than the predetermined telephone number, in which case the processing operation information 23 may include, for each of the one or more communication devices, the predetermined telephone number associated therewith, the specific code, and possibly other information (e.g., one or more periods of time during which this feature is to be applied); and an outgoing call barring feature whereby an outgoing call determined to be originated by the identity $21_j$ and destined for any of one or more communication devices each associated with a predetermined identifier (e.g., a predetermined telephone number, IP address, or SIP URI) is to be prevented from being established, in which case the processing operation information 23 may include, for each of the one or more communication devices, the predetermined identifier associated therewith and possibly other information (e.g., one or more periods of time during which this feature is to be applied).

It is to be understood that these examples of telephony features are presented for illustrative purposes only and are not to be considered limiting in any respect as various other telephony features are or may become available. Also, the above examples of information that may be part of the processing operation information 23 associated with the identity $21_j$ in relation to one or more telephony features are presented for illustrative purposes only and are not to be considered limiting in any respect.

It is also to be understood that, in some embodiments, the processing operation information 23 associated with any one of the identities $21_1 \ldots 21_5$ may not relate to any particular telephony feature. Generally, the processing operation information 23 associated with each of the identities $21_1 \ldots 21_5$ is indicative of one or more operations to be performed by the call processing system 20 to process calls intended for or originated by that identity.

In this embodiment, each of the identities $21_1 \ldots 21_5$ may also be associated with contact information 37 regarding one or more contacts (e.g., friends, colleagues, business contacts or other acquaintances) of the person designated by that identity. For example, for each of these one or more contacts, the contact information 37 may include a telephony identifier associated with that party, such as a telephone number, a name, an electronic serial number (ESN), an IP address, a SIP URI, Electronic Numbering (ENUM) information, etc. Thus, in this case, the contact information 37 associated with each of the identities $21_1 \ldots 21_5$ can be viewed as part of an address book of the person designated by that identity. The contact information 37 associated with each of the identities $21_1 \ldots 21_5$ may be configured by the person designated by that identity during a provisioning phase (e.g., via a data network site operated by the service provider operating the call processing system 20).

While in this embodiment the database 36 includes certain information in connection with each of the identities $21_1 \ldots 21_5$, the database 36 may include various other information in other embodiments. Also, while in this example each of the identities $21_1 \ldots 21_5$ designates a single one of the users $12_1 \ldots 12_4$, in other examples, the telephone number 19 may be associated with an additional identify designating two or more of the users $12_1 \ldots 12_4$. For instance, in some cases, in addition to being associated with the identities $21_1 \ldots 21_5$, the telephone number 19 may be associated with an identity designating the family formed by the users $12_1 \ldots 12_4$.

Also, while in this example the record $200_j$ associates the telephone number 19 (in this case, (555) 555-1234) with the group of identities $21_1 \ldots 21_5$, it will be appreciated that, in some embodiments, one or more of the records $200_1$-$200_M$ in the database 36 may include a telephony identifier 19 that is not associated with a group of identities, but that is rather generally associated with a subscriber to communication services provided by the service provider operating the call processing system 20 without defining two or more identities.

In addition, while it is depicted in FIG. 1 as being one component, the database 36 may be distributed in nature. For example, the database 36 can have portions of its content stored in different data storage media possibly located in different network components of the communications network 10.

Figure 3:
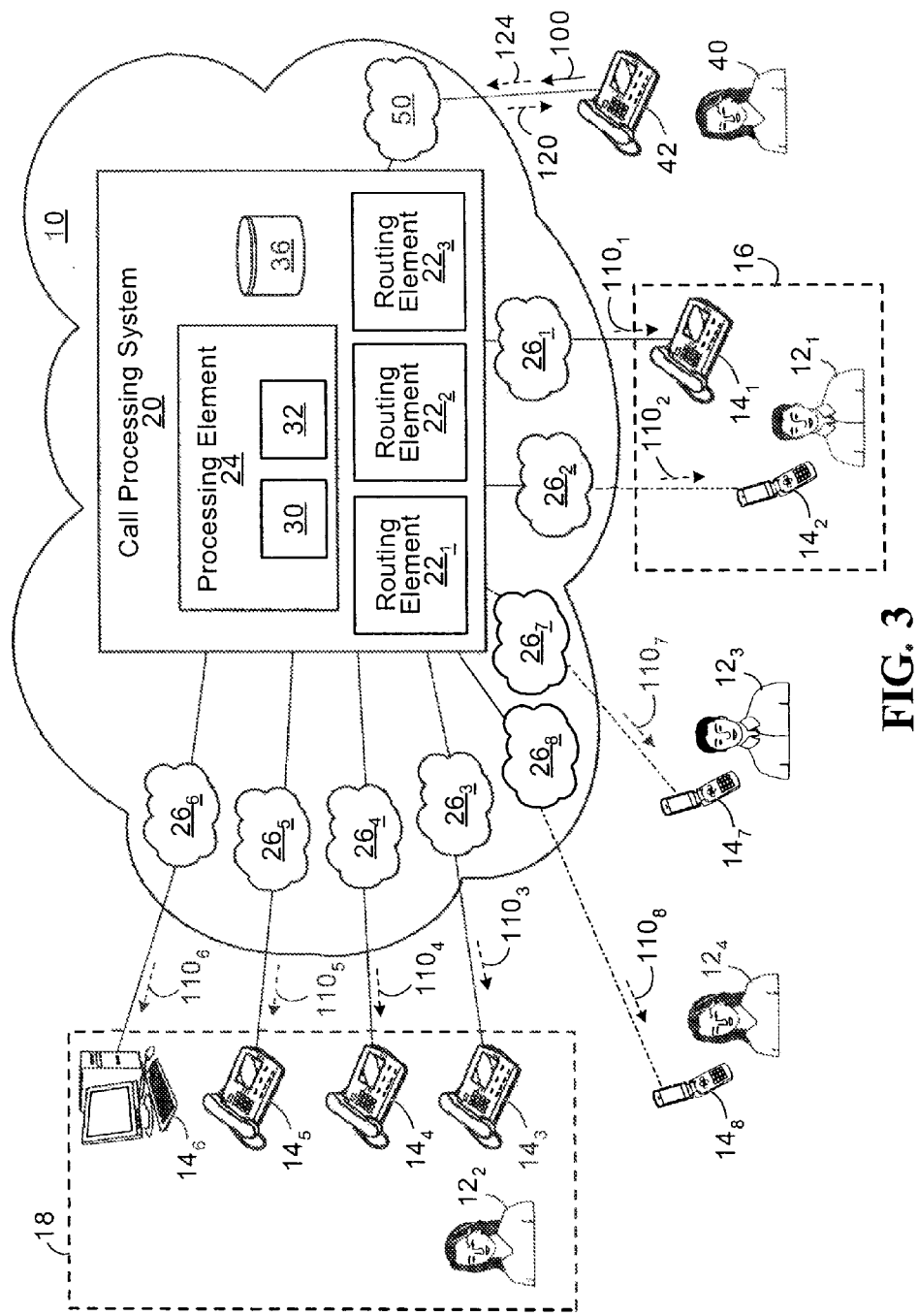
FIG. 3 shows an example of signals potentially exchanged between the call processing system and various communication devices over the communications network.

Referring now to FIG. 3, operation of the call processing system 20, and in particular of the processing element 24, will be illustrated in the context of an example in which a calling party 40 uses a communication device 42 for placing a call to the telephone number 19, in this case, (555) 555-1234, associated with the group of identities $21_1 \ldots 21_5$ designating the users $12_1 \ldots 12_4$. In various embodiments, the communication device 42 may be a wired POTS phone, a wireless phone, a VoIP phone, an ATA-equipped POTS phone, a softphone, a telephony-enabled television unit, or any other suitable communication device.

For example, the calling party 40 may interact with the communication device 42 to dial the telephone number (555) 555-1234, select a contact identifier from a contact function implemented by the communication device 42 to indicate his/her desire to call that telephone number, or speak a voice command indicative of his/her desire to call that telephone number. This interaction of the calling party 40 with the communication device 42 results in the communication device 42 transmitting a signal 100 over a network portion 50 of the communications network 10 (e.g., a telephone line in the PSTN, a wireless link in combination with a base station and a wireline link, a digital communications link, and/or one or more other network components (e.g., routing elements, gateways, etc,)). The signal 100, which travels to the call processing system 20, serves to place the call to the telephone number (555) 555-1234. For example, and depending on the nature of the network portion 50 and the nature of the interaction of the calling party 40 with the communication device 42, the signal 100 may convey one or more dual-tone multi-frequency (DTMF) tones, one or more data packets, or other information serving to place the call for the telephone number (555) 555-1234.

In the call processing system 20, the signal 100 is eventually processed by the processing element 24 (possibly after being processed by one or more other elements of the call processing system 20 such as, for instance, one or more of the routing elements $22_1 \ldots 22_3$). As part of this process, the processing entity 30 determines that the signal 100 originates from the communication device 42 and serves to place the call to the telephone number (555) 555-1234. More particularly, the processing entity 30 obtains, based on the signal 100, information regarding an origin of the call and information indicating that the call has been placed to the telephone number (555) 555-1234. For instance, in this embodiment, the information regarding the origin of the call is indicative of a telephone number identifying the communication device 42, which, for purposes of this example, is assumed to be (555) 555-5678, and of a time at which the call was originated (e.g., a day, hour, minute, etc.).

As it carries out its call processing logic, the processing entity 30 consults the database 36 to determine whether certain actions are to be performed in respect of the call placed to the telephone number (555) 555-1234. Thus, in this example, the processing entity 30 consults the database 36 in an attempt to find a given one of the record $200_1$-$200_M$ that includes a telephony identifier 39 corresponding to the telephone number (555) 555-1234. In this case, upon finding the record $200_j$ which corresponds to the telephone number (555) 555-1234, the processing entity 30 determines that this telephone number is associated with the group of identities $21_1 \ldots 21_5$.

The processing entity 30 proceeds to determine for which of the identities $21_1 \ldots 21_5$ the call placed to the telephone number (555) 555-1234 is intended and then causes the call to be routed accordingly, for instance, by causing the call to be directed to one or more of the communication devices $14_1 \ldots 14_8$. In this embodiment, the processing entity 30 determines, based on the information regarding the origin of the call placed to the telephone number (555) 555-1234, at least one particular identity of the identities $21_1 \ldots 21_5$ for which the call is intended, and proceeds to cause routing of the call based on the call processing information 25 associated with the at least one particular identity of the identities $21_1 \ldots 21_5$.

More particularly, in this embodiment, the processing entity 30 searches the record $200_j$ to determine whether the telephone number (555) 555-5678, from which originates the call placed to the telephone number (555) 555-1234, is part of the contact information 37 associated with any one of the identities $21_1 \ldots 21_5$. Different scenarios that can arise will now be discussed.

Scenario I: Originating Telephone Number is Part of Contact Information Associated with a Single Identity If the telephone number (555) 555-5678 is part of the contact information 37 associated with a single one of the identities $21_1 \ldots 21_5$, the processing entity 30 concludes that the call placed to the telephone number (555) 555-1234 is intended for that identity.

In this case, the processing entity 30 proceeds to cause the routing entity 32 to effect routing of the call based on the call processing information 25 associated with the single one of the identities $21_1 \ldots 21_5$. For instance, based on the call processing information 25 associated with the single one of the identities $21_1 \ldots 21_5$, the routing entity 32 may cause one or more of the routing elements $22_1 \ldots 22_3$ to send one or more signals $110_1 \ldots 110_8$ over one or more of the network portions $26_1 \ldots 26_8$ to route the call to one or more of the communication devices $14_1 \ldots 14_8$, and/or may cause the call to be routed in other ways (e.g., to a voicemail system). While the call is being routed, the routing entity 32 may cause the communication device 42 to provide a ring back tone (e.g., a standard or other audible tone or sound file) to indicate to the calling party 40 that the call is being placed.

For example, assume that (i) the single one of the identities $21_1 \ldots 21_5$ is the identity $21_2$ (which is the business identity of the user $12_1$, i.e., the father), and (ii) the call processing information 25 associated with the identity $21_2$ indicates that any call (or any call originating from one or more predetermined telephone numbers, including the telephone number (555) 555-5678) intended for the identity $21_2$ and originated on weekdays between 8:00 AM and 5:00 PM is to be routed to the communication device $14_1$ (i.e., the wired POTS phone at the workplace 16 of the user $12_1$) and that any call intended for the identity $21_2$ at any other time is to be routed to the communication device $14_2$ (i.e., the wireless phone of the user $12_1$). Thus, in a case where the call placed to the telephone number (555) 555-1234 was originated at 2:30 PM on a Tuesday, the routing entity 32 causes the routing element $22_1$ to send a signal $110_1$ over the network portion $26_1$ to route the call to the communication device $14_1$, while in a case where the call was originated at 10:30 AM on a Saturday, the routing entity 32 causes the routing element $22_1$ to send a signal $110_2$ over the network portion $26_2$ to route the call to the communication device $14_2$.

As another example, assume that (i) the single one of the identities $21_1 \ldots 21_5$ is the identity $21_1$ (which is the personal identity of the user $12_1$, i.e., the father), and (ii) the call processing information 25 associated with the identity $21_1$ indicates that any call intended for the identity $21_1$ and originated on weekdays between 7:00 AM and 6:00 PM is to be routed to the communication device $14_2$ (i.e., the wireless phone of the user $12_1$) and that any call intended for the identify $21_1$ at any other time is to be routed to each of the communication devices $14_3$ and $14_4$ (i.e., the VoIP phone and the ATA-equipped POTS phone in the kitchen and the parents' bedroom of the residence 18, respectively). Thus, in a case where the call placed to the telephone number (555) 555-1234 was originated at 1:40 PM on a Tuesday, the routing entity 32 causes the routing element $22_2$ to send a signal $110_2$ over the network portion $26_2$ to route the call to the communication device $14_2$, while in a case where the call was originated at 8:00 PM on a Monday, the routing entity 32 causes the routing element $22_3$ to send signals $110_3$ and $110_4$ over the network portions $26_3$ and $26_4$ to route the call to the communication devices $14_3$ and $14_4$.

As yet another example, assume that (i) the single one of the identities $21_1 \ldots 21_5$ is the identity $21_4$ (which designates the user $12_3$, i.e., the son), and (ii) the call processing information 25 associated with the identity $21_4$ indicates that any call intended for the identity $21_4$ is to be first routed to the communication device $14_5$ (i.e., the VoIP phone in the son's bedroom at the residence 18) and, if not answered within a certain period of time (e.g., a certain number of rings), then routed to the communication device $14_7$ (i.e., the wireless phone of the user $12_3$). Thus, the routing entity 32 causes the routing element $22_3$ to send a signal $110_5$ over the network portion $26_5$ to route the call to the communication device $14_5$ and, if the call is not answered within the certain period of time, the routing entity 32 causes the routing element $22_2$ to send a signal $110_7$ over the network portion $26_7$ to route the call to the communication device $14_7$.

As yet another example, assume that (i) the single one of the identities $21_1 \ldots 21_5$ is the identity $21_3$ (which designates the user $12_2$, i.e., the mother), and (ii) the call processing information 25 associated with the identity $21_3$ indicates that any call intended for the identity $21_3$ is to be routed to each of the communication devices $14_3$ and $14_4$ (i.e., the VoIP phone and the ATA-equipped POTS phone in the kitchen and the parents' bedroom of the residence 18, respectively). Thus, in that case, the routing entity 32 causes the routing element $22_3$ to send signals $110_3$ and $110_4$ over the network portions $26_3$ and $26_4$ to route the call to the communication devices $14_3$ and $14_4$.

It will be appreciated that these examples are presented for illustrative purposes only and that the routing entity 32 may cause the call placed to the telephone number (555) 555-1234 to be routed in various manners depending on the call processing information 25 associated with the single one of the identities $21_1 \ldots 21_5$ for which the call is determined to be intended (e.g., the routing entity 32 may cause one or more actions to be performed in relation to one or more telephony features that may be subscribed to by the person designated by that identity).

It will also be appreciated that, in cases where the routing entity 32 causes the call placed to the telephone number (555) 555-1234 to be routed to a given one of the communication devices $14_1 \ldots 14_8$ that is associated with two or more of the identities $21_1 \ldots 21_5$ (e.g., the communication device $14_3$ or $14_4$), the routing entity 32 may cause that given communication device to indicate which one of these identities the call is intended for. For example, the routing entity 32 may cause the given communication device to provide an audible indication (e.g., a distinctive ringtone and/or a voice announcement) and/or a visual indication (e.g., a displayed announcement, which may be combined with CLID information, and/or lighting up of a light) of which one of these identities the call is intended for.

Scenario II: Originating Telephone Number is Part of Contact Information Associated with Two or More Identities If the telephone number (555) 555-5678 is part of the contact information 37 associated with each of two or more of the identities $21_1 \ldots 21_5$, the processing entity 30 concludes that the call placed to the telephone number (555) 555-1234 is intended for at least one of these two or more identities.

In some embodiments, upon concluding that the call placed to the telephone number (555) 555-1234 is intended for at least one of two or more of the identities $21_1 \ldots 21_5$, the processing entity 30 may cause the routing entity 32 to effect routing of the call based on the call processing information 25 associated with each of these two or more identities. For instance, based on the call processing information 25 associated with the two or more of the identities $21_1 \ldots 21_5$, the routing entity 32 may cause one or more of the routing elements $22_1 \ldots 22_3$ to send one or more signals $110_8 \ldots 110_8$ over one or more of the network portions $26_1 \ldots 26_8$ to route the call to one or more of the communication devices $14_1 \ldots 14_8$, and/or may cause the call to be routed in other ways (e.g., to a voicemail system). For example, in a case where the telephone number (555) 555-5678 is part of the contact information 37 associated with each of the identities $21_1$ and $21_3$, which respectively designate the user $12_1$ (i.e., the father) and the user $12_2$ (i.e., the mother), the routing entity 32 may cause the routing element $22_3$ to send signals $110_3$ and $110_4$ over the network portions $26_3$ and $26_4$ to route the call to the communication devices $14_3$ and $14_4$.

Alternatively, in some embodiments, upon concluding that the call placed to the telephone number (555) 555-1234 is intended for at least one of two or more of the identities $21_1 \ldots 21_5$, the processing entity 30 may attempt to single out a specific one of these two or more identities as being more likely to be the identity for which the call is intended.

For example, in some embodiments, the processing entity 30 may consult a call history in an attempt to single out a specific identity for which the call is intended. The call history may be included in the record $200_j$ of the database 36 or in another database to which the processing entity 30 has access. In some cases, the call history may indicate which of the identities $21_1 \ldots 21_5$ effectively answered previous calls placed to the telephone number (555) 555-1234 from various origins (e.g., various origination telephone numbers). For instance, this can be achieved by indicating which of the communication devices $14_1 \ldots 14_8$ have been used to answer these previous calls or using other techniques to flag incoming calls as having been answered by one of the identities $21_1 \ldots 21_5$. Upon consulting the call history, the processing entity 30 may determine that a specific one of the two or more of the identities $21_1 \ldots 21_5$, which are associated with the contact information 37 that includes the telephone number (555) 555-5678, has been involved in answering most or all of the previous calls originating from that telephone number or the last call originating from that telephone number, in which case the processing entity 30 may conclude that the call placed to the telephone number (555) 555-1234 is intended for that specific identity. In other cases, the call history may indicate which of the identities $21_1 \ldots 21_5$ effectively placed previous calls to various destinations (e.g., various destination telephone numbers). For instance, this can be achieved by indicating which of the communication devices $14_1 \ldots 14_8$ have been used to place these previous calls or using other techniques to flag outgoing calls as having been placed by one of the identities $21_1 \ldots 21_5$. Upon consulting the call history, the processing entity 30 may determine that a specific one of the two or more of the identities $21_1 \ldots 21_5$, which are associated with the contact information 37 that includes the telephone number (555) 555-5678, has been involved in placing most or all of the previous calls to that telephone number or the last call placed to that telephone number, in which case the processing entity 30 may conclude that the call placed to the telephone number (555) 555-1234 is intended for that specific identity. In these cases, the processing entity 30 may cause the routing entity 32 to effect routing of the call based on the call processing information 25 associated with the specific one of the identities $21_1 \ldots 21_5$, in a manner similar to that described above in respect of Scenario I.

As another example, in some embodiments, the processing entity 30 may cause transmission of a signal 120 to the communication device 42 in order to invite the calling party 40 to specify which of the identities $21_1 \ldots 21_5$ he/she is trying to reach. For example, the signal 120 may convey a message inviting the calling party 40 to specify which of the identities $21_1 \ldots 21_5$ he/she is trying to reach. Depending on functionality of the communication device 42, the message may comprise a voice message and/or a displayable message prompting the calling party 40 to specify which of the identities $21_1 \ldots 21_5$ he/she is trying to reach. For instance, in a case where the processing entity 30 concluded that the call placed to the telephone number (555) 555-1234 is intended for at least one of the identities $21_1$ and $21_3$ and where the user $12_1$ is named John and the user $12_2$ is named Carol, the message may be "Are you trying to reach John or Carol?", "Press 1 if you want to reach John, 2 if you want to reach Carol, or 3 if you want to reach either of them", or any conceivable variant thereof. Alternatively, the message may be "Please specify who you are trying to reach" or any conceivable variant thereof such as to not give out the names of John and Carol. The calling party 40 may then interact with the communication device 42, for instance, by pressing on one or more buttons or otherwise manually interacting therewith and/or speaking one or more utterances in order to specify which of the identities $21_1 \ldots 21_5$ he/she is trying to reach, thereby causing the communication device 42 to transmit a signal 124 indicative of which of the identities $21_1 \ldots 21_5$ the calling party 40 is trying to reach. Upon processing the signal 124 indicative of which of the identities $21_1 \ldots 21_5$ the calling party 40 is trying to reach (possibly applying a speech recognition function in a case where the calling party 40 vocally specified which identity he/she is trying to reach), the processing entity 30 concludes that the call placed to the telephone number (555) 555-1234 is intended for that specified identity. In such a case, the processing entity 30 may cause the routing entity 32 to effect routing of the call based on the call processing information 25 associated with the specified one of the identities $21_1 \ldots 21_5$, in a manner similar to that described above in respect of Scenario I.

Scenario III: Originating Telephone Number is not Part of Contact Information Associated with any Identity If the telephone number (555) 555-5678 is not part of the contact information 37 associated with any of the identities $21_1 \ldots 21_5$, the processing entity 30 concludes that the call placed to the telephone number (555) 555-1234 is intended for an undetermined one of these identities.

In some embodiments, upon concluding that the call placed to the telephone number (555) 555-1234 is intended for an undetermined one of the identities $21_1 \ldots 21_5$, the processing entity 30 may cause the routing entity 32 to effect routing of the call based on the call processing information 25 associated with each of these identities. For instance, based on the call processing information 25 associated with each of the identities $21_1 \ldots 21_5$, the routing entity 32 may cause one or more of the routing elements $22_1 \ldots 22_3$ to send one or more signals $110_1 \ldots 110_8$ over one or more of the network portions $26_1 \ldots 26_8$ to route the call to one or more of the communication devices $14_1 \ldots 14_8$, and/or may cause the call to be routed in other ways (e.g., to a voicemail system). For example, in some cases, the routing entity 32 may cause the routing elements $22_1 \ldots 22_3$ to send signals $110_1 \ldots 110_8$ over the network portions $26_1 \ldots 26_8$ to route the call to each of the communication devices $14_1 \ldots 14_8$, either simultaneously or in a particular sequence.

Alternatively, in some embodiments, upon concluding that the call placed to the telephone number (555) 555-1234 is intended for an undetermined one of the identities $21_1 \ldots 21_5$, the processing entity 30 may attempt to single out a specific one of these identities as being more likely to be the identity for which the call is intended.

For example, in some embodiments, the processing entity 30 may consult the call history described above in connection with Scenario II. In some cases, upon consulting the call history, the processing entity 30 may determine that a specific one of the identities $21_1 \ldots 21_5$ has been involved in answering most or all of the previous calls originating from the telephone number (555) 555-5678 or the last call originating from that telephone number, in which case the processing entity 30 may conclude that the call placed to the telephone number (555) 555-1234 is intended for that specific identity. In other cases, upon consulting the call history, the processing entity 30 may determine that a specific one of the identities $21_1 \ldots 21_5$ has been involved in placing most or all of the previous calls to the telephone number (555) 555-5678 or the last call placed to that telephone number, in which case the processing entity 30 may conclude that the call placed to the telephone number (555) 555-1234 is intended for that specific identity. In these cases, the processing entity 30 may cause the routing entity 32 to effect routing of the call based on the call processing information 25 associated with the specific one of the identities $21_1 \ldots 21_5$, in a manner similar to that described above in respect of Scenario I.

As another example, in some embodiments, the processing entity 30 may cause transmission of a signal 120 to the communication device 42 in order to invite the calling party 40 to specify which of the identities $21_1 \ldots 21_5$ he/she is trying to reach, as described above in connection with Scenario II. The calling party 40 may then interact with the communication device 42, for instance, by pressing on one or more buttons or otherwise manually interacting therewith and/or speaking one or more utterances in order to specify which of the identities $21_1 \ldots 21_5$ he/she is trying to reach, thereby causing the communication device 42 to transmit a signal 124 indicative of which of the identities $21_1 \ldots 21_5$ the calling party 40 is trying to reach. Upon processing the signal 124 indicative of which of the identities $21_1 \ldots 21_5$ the calling party 40 is trying to reach (possibly applying a speech recognition function in a case where the calling party 40 vocally specified which identity he/she is trying to reach), the processing entity 30 concludes that the call placed to the telephone number (555) 555-1234 is intended for that specified identity. In such a case, the processing entity 30 may cause the routing entity 32 to effect routing of the call based on the call processing information 25 associated with the specified one of the identities $21_1 \ldots 21_5$, in a manner similar to that described above in respect of Scenario I.

As yet another example, in some embodiments, the processing entity 30 may access a public data network such as the Internet in order to determine whether there is a relationship between any one of the identities $21_1 \ldots 21_5$ and the origin of the call placed to the telephone number (555) 555-1234. More particularly, the processing entity 30 may perform a search on one or more sites (e.g., web sites) of the public data network on a basis of information regarding the origin of the call (e.g., the telephone number (555) 555-5678 identifying the communication device 42 and/or a name or other identifier of the calling party 40) and information pertaining to each of the identities $21_1 \ldots 21_5$ (e.g., a name of a given one of the users $12_1 \ldots 12_4$ designated by that identity) in order to determine whether there is a relationship between the origin of the call and any one of these identities. For example, the processing entity 30 may perform a search on one or more social networking sites (e.g., Facebook®, LinkedIn®, MySpace®) and/or one or more search engine sites (e.g., Google®, Yahoo®). If, upon processing results of the search, the processing entity 30 determines that there is a relationship between the origin of the call and a given one of the identities $21_1 \ldots 21_5$ (e.g., a name of the calling party 40 has been found as a friend or contact in a social networking site profile of one of the users $12_1 \ldots 12_4$ designated by that given identity), the processing entity 30 may conclude that the call is intended for that given identity. In such a case, the processing entity 30 may cause the routing entity 32 to effect routing of the call based on the call processing information 25 associated with the given one of the identities $21_1 \ldots 21_5$, in a manner similar to that described above in respect of Scenario I.

While in embodiments considered above a determination as to which of the identities $21_1 \ldots 21_5$ the call placed to the telephone number (555) 555-1234 is intended for is effected in a particular manner, it will be appreciated that this determination may be effected in various other manners in other embodiments.

For example, and as mentioned previously, in some embodiments, in addition to being associated with the identities $21_1 \ldots 21_5$, the telephone number (555) 555-1234 may be associated with a sixth identity designating the family formed by the users $12_1 \ldots 12_4$. In these embodiments, the call processing information 25 associated with the identity designating the family formed by the users $12_1 \ldots 12_4$ may specify to route a call intended for the family to one or more common ones of the communication devices $14_1 \ldots 14_8$ (e.g., the communication device $14_3$ located in a common area of the residence 18) and, optionally, if the call remains unanswered after a predetermined period of time (e.g., a predetermined number of rings), to route the call to a voicemail system. For instance, upon encountering Scenario III described above where the telephone number (555) 555-5678 from which originates the call placed to the telephone number (555) 555-1234 is not part of the contact information 37 associated with any of the identities $21_1 \ldots 21_5$, the processing entity 30 may conclude, by default, that the call placed to the telephone number (555) 555-1234 is intended for the identity designating the family formed by the users $12_1 \ldots 12_4$ and may proceed to cause the routing entity 32 to effect routing of the call based on the call processing information 25 associated with the identity designating the family formed by the users $12_1 \ldots 12_4$, thereby causing the call to be routed to one or more common ones of the communication devices $14_1 \ldots 14_8$ and possibly to a voicemail system.

In addition, one or more other sources of information may be consulted by the processing entity 30 in making a determination as to which of the identities $21_1 \ldots 21_5$ a call placed to the telephone number (555) 555-1234 is intended for. For example, in some embodiments, the processing entity 30 may have access to one or more directories associated with one or more of the users $12_1 \ldots 12_4$ designated by the identities $21_1 \ldots 21_5$ (e.g., a corporate directory, a university directory, or another organization's directory) and may consult these one or more directories in an attempt to determine to which of the identities $21_1 \ldots 21_5$ a call placed to the telephone number (555) 555-1234 is intended for. For instance, in one case, further to provisioning of the identity $21_2$, i.e., the business identity of the user $12_1$, the processing entity 30 may have knowledge that the user $12_1$ works for a particular company and may have access to that company's directory, in this case, in determining to which of the identities $21_1 \ldots 21_5$ a given call placed to the telephone number (555) 555-1234 is intended for, the processing entity 30 may consult the director) of the particular company and, upon finding in the directory an origination telephone number and/or a calling party's name for the given call, may determine that the given call is intended for the identity $21_2$ and cause the given call to be routed accordingly.

Also, while in embodiments considered above the processing entity 30 determines to which of the identities $21_1 \ldots 21_5$ a call placed to the telephone number (555) 555-1234 is intended for by consulting different sources of information, including the contact information 37 associated with each of these identities, a call history of previous calls, and one or more sites of a public data network, it will be appreciated that, in other embodiments, the processing entity 30 may effect this determination by consulting only one or a different combination of these sources of information (or other sources of information).

It will thus be appreciated that, in this embodiment, the telephone number (555) 555-1234 being associated with the group of identities $21_1 \ldots 21_5$ which designate the users $12_1 \ldots 12_4$ is particularly useful from various perspectives. For example, in this case, the users $12_1 \ldots 12_4$ and the communication devices $14_1 \ldots 14_8$ share a common telephone number (i.e., (555) 555-1234) and every incoming call placed to that telephone number is routed according to which of the identities $21_1 \ldots 21_5$ it is determined to be intended for. This benefits the users $12_1 \ldots 12_4$ who only need to remember and give out to their friends, colleagues and/or other acquaintances a single telephone number (i.e., (555) 555-1234) at which they can be reached. Similarly, this benefits these friends, colleagues and/or other acquaintances of the users $12_1 \ldots 12_4$ who only need to remember a single telephone number (i.e., (555) 555-1234) at which each of the users $12_1 \ldots 12_4$ can be reached. Also, by virtue of routing every incoming call placed to the telephone number (555) 555-1234 according to which of the identities $21_1 \ldots 21_5$ it is determined to be intended for, undesirable situations where a given one of the users $12_1 \ldots 12_4$ for whom the call is not intended wastes his/her time picking up the call can be avoided.

Although the above-considered example relates to an incoming call placed to the telephone number (555) 555-1234 associated with the group of identities $21_1 \ldots 21_5$, it will be appreciated that this association between the telephone number (555) 555-1234, the users $12_1 \ldots 12_4$ and the communication devices $14_1 \ldots 14_8$ may also provide other benefits in respect of an outgoing call originated by any of these users using any of these communication devices.

For example, when a given one of the users $12_1 \ldots 12_4$ uses a given one of the communication devices $14_1 \ldots 14_8$ to place a call, the processing entity 30 may determine that a given one of the identities $21_1 \ldots 21_5$ designates the given one of the users $12_1 \ldots 12_4$ and proceed to process the call based on the call processing information 25 associated with that given identity. For instance: where the call processing information 25 associated with the given one of the identities $21_1 \ldots 21_5$ indicates that any outgoing call originated by that identity is to be accompanied by specific CLID information identifying that identity (e.g., a name of the given one of the users $12_1 \ldots 12_4$), the processing entity 30 may cause the routing entity 32 to effect display of this specific CLID information on a called party's device; where the call processing information 25 associated with the given one of the identifies $21_1 \ldots 21_5$ relates to a speed calling feature specific to this identity, the processing entity 30 may enable the given one of the users $12_1 \ldots 12_4$ to use speed calling codes pertaining to this speed calling feature to place the call; where the call processing information 25 associated with the given one of the identities $21_1 \ldots 21_5$ indicates that the contact information 37 associated with that given identity can be used when an outgoing call is originated by that given identity, the processing entity 30 may enable the given one of the users $12_1 \ldots 12_4$ to specify a particular contact for which the outgoing call is intended (e.g., by selecting the particular contact from an audio or displayed list of contacts or by speaking a voice command identifying the particular contact); where the call processing information 25 associated with the given one of the identities $21_1 \ldots 21_5$ relates to one or more outgoing call telephony features (e.g., a CLID blocking feature, an outgoing call barring feature, etc.) to be applied to any call originated by that identity, the processing entity 30 may cause these one or more outgoing call telephony features to be applied; and so on.

The processing entity 30 may identify a given one of the identities $21_1 \ldots 21_5$ designating a given one of the users $12_1 \ldots 12_4$ that originates a given call in various ways in various embodiments. For example, in some cases, the processing entity 30 may identify the given one of the identities $21_1 \ldots 21_5$ based on the (hidden) identifier of the given one of the communication devices $14_1 \ldots 14_8$ that has been used to originate the given call. In other cases, the processing entity 30 may identify the given one of the identities $21_1 \ldots 21_5$ based on information provided by the given one of the users $12_1 \ldots 12_4$ when originating the call, such as a name, an identity number or code (e.g., conveyed by one or more DTMF tones transmitted by the given one of the communication devices $14_1 \ldots 14_8$ in response to one or more buttons thereof being pressed), and/or a voiceprint. In yet other cases, the processing entity 30 may identify the given one of the identities $21_1 \ldots 21_5$ based on a signal received from the given one of the communication devices $14_1 \ldots 14_8$ that has been used to originate the given call as a result of the given one of the users $12_1 \ldots 12_4$ pressing on one or more dedicated buttons (e.g., physical buttons, soft buttons, or graphical buttons) or otherwise manually interacting with the given one of the communication devices $14_1 \ldots 14_8$ in order to specify that given identity.

In addition to facilitating processing of calls involving the users $12_1 \ldots 12_4$, the group of identities $21_1 \ldots 21_5$ allows the users $12_1 \ldots 12_4$ to manage their communication needs in a flexible and convenient way. A few examples of this flexibility and convenience will now be illustrated with reference to FIG. 4, which shows a computing device 70 that can be used by the users $12_1 \ldots 12_4$ to access and interact with a data network site (e.g., a web site) implemented by a computing element 72 of the call processing system 20.

In some embodiments, the computing device 70 may be implemented as a personal computer (PC) such as a desktop computer, a laptop computer, or a tablet PC. The computing device 70 is provided with at least one input device such as a keyboard, a mouse, a touchscreen, a stylus, a microphone, etc., as well as a display and possibly one or more other output devices (e.g., speakers) that enable interaction of the users $12_1 \ldots 12_4$ with the computing device 70. The computing device 70 may be operative to ran a software application implementing a network browser (e.g., a web browser) with which the users $12_1 \ldots 12_4$ can interact via the display (and possibly one or more other output devices) and the at least one input device in order to access and interact with the data network site implemented by the computing element 72. Although shown as a distinct component in FIG. 4, in some embodiments, and depending on functionality of the communication devices $14_1 \ldots 14_8$, the computing device 70 may be implemented by one of these communication devices (e.g., the communication device $14_6$).

The computing element 72 may be implemented as a server (e.g., a web server) operative to communicate with the computing device 70 via a data network portion 74. Although they are shown as distinct components in FIG. 4, in some embodiments, the computing element 72 and the processing element 24 may be functional elements implemented by a common network component of the call processing system 20.

The data network site implemented by the computing element 72 enables one or more of the users $12_1 \ldots 12_4$ to manage the identities $21_1 \ldots 21_5$ defined in connection with the record $200_j$ maintained in the database 36. For example, the data network site may provide one or more pages (e.g., web pages) with functions and controls (e.g., buttons, selection tools, text input fields, etc.) allowing one or more of the users $12_1 \ldots 12_4$ to: configure (e.g., provide and/or modify) information associated with any one of the identities $21_1 \ldots 21_5$ (e.g., call processing information 25, contact information 37, and/or identity identification information 31 associated with that identity); associate an additional identity, in addition to the group of identities $21_1 \ldots 21_5$, with the telephone number (555) 555-1234; and/or associate another telephone number, in addition to the telephone number (555) 555-1234, with one or more of the identities $21_1 \ldots 21_5$. In some cases, each of the users $12_1 \ldots 12_4$ may be allowed to effect such management operations via the data network site for any of the identities $21_1 \ldots 21_5$. In other cases, such management operations may be performed in respect of some or all of the identities $21_1 \ldots 21_5$ only by one or more of the users $12_1 \ldots 12_4$ authorized to do so (e.g., the users $12_1$ and $12_2$), in which case the data network site may implement an authentication process to allow these one or more authorized users to manage the identities $21_1 \ldots 21_5$.

A few examples of how the users $12_1 \ldots 12_4$ can use the computing device 70 to access and interact with the data network site implemented by the computing element 72 in order to manage the identities $21_1 \ldots 21_5$ will now be illustrated.

Example 1

Configuring Information Associated with an Identity

As a first example, one or more of the users $12_1 \ldots 12_4$ may use the computing device 70 to access and interact with the data network site implemented by the computing element 72 in order to configure (e.g., provide and/or modify) information associated with any one of the identities $21_1 \ldots 21_5$. For instance, by using controls and functions provided by the data network site, a given one of the users $12_1 \ldots 12_4$ may: configure the call processing information 25 associated with any one of the identities $21_1 \ldots 21_5$ (e.g., specify or modify one or more routing operations to be performed for incoming calls intended for that identity, enable, disable or modify application of one or more telephony features to calls involving that identity, etc.); configure the contact information 37 associated with any one of the identities $21_1 \ldots 21_5$ (e.g., add or remove one or more contacts, change a telephone number of a given contact, import one or more contacts from another address book or service such as Hotmail® or Google Talk®, etc.); and/or configure the identity identification information 31 identifying any one of the identities $21_1 \ldots 21_5$ (e.g., change a name or other identifier serving to identify that identity). The given one of the users $12_1 \ldots 12_4$ may effect such configuration operations during an initial provisioning phase or at any time thereafter.

Example 2

Associating an Additional Telephone Number to One or More Identities

As a second example, in some situations, it may be desired to associate an additional telephone number, in addition to the telephone number (555) 555-1234, to one or more of the identities $21_1 \ldots 21_5$ such that a party designated by each of these one or more identities is reachable by placing a call to either the telephone number (555) 555-1234 or the additional telephone number.

Figure 4:
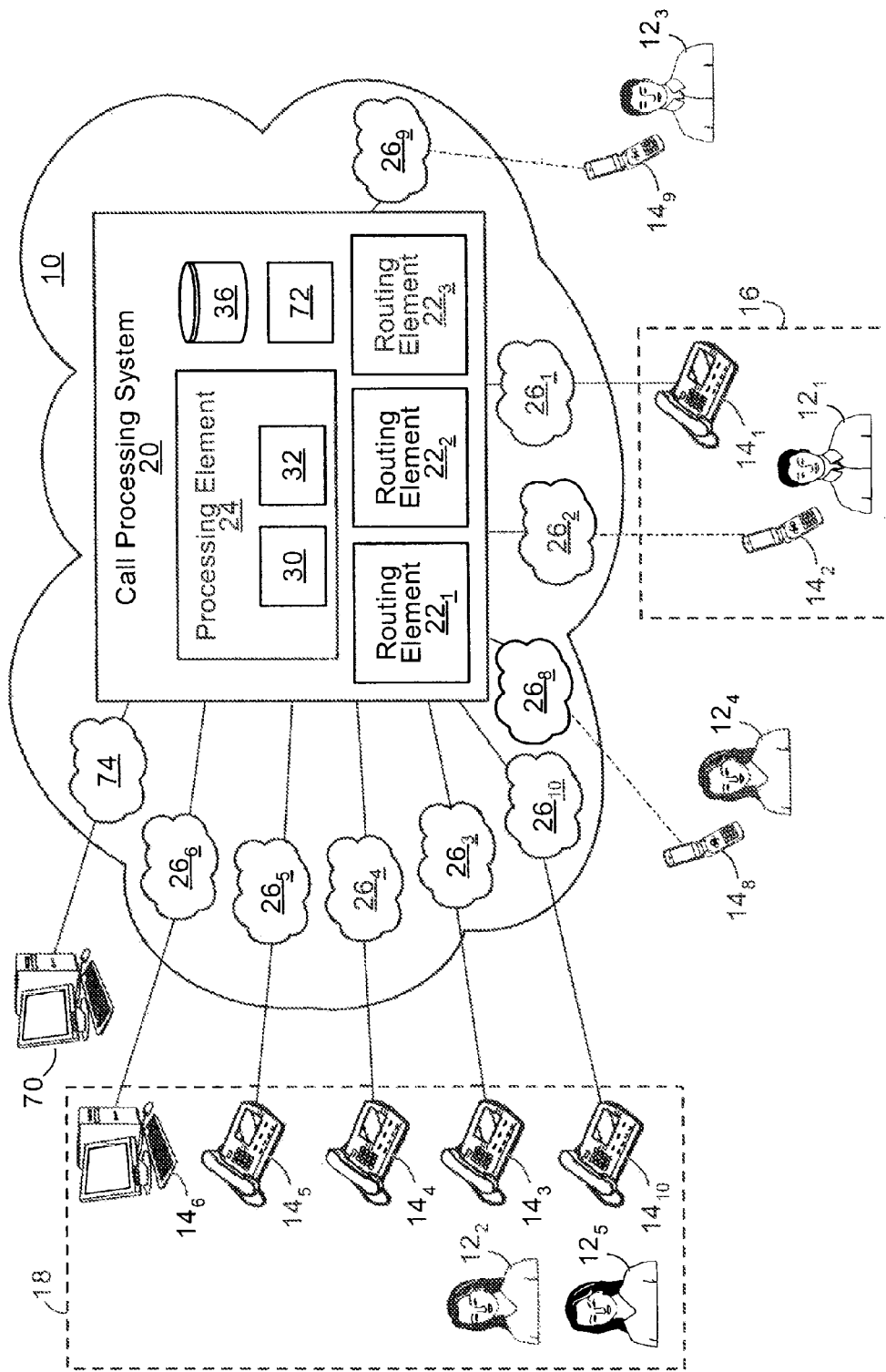
FIG. 4 shows an example in which the users are enabled to use a computing device to access and interact with a data network site implemented by the call processing system in order to manage the group of identities.

For instance, FIG. 4 illustrates an example situation in which the user $12_3$ (i.e., the son) is moving to an area remote from the residence 18 and its surrounding area where he has been living. For purposes of this example, it is assumed that the user $12_3$ is moving to a different city (possibly in a different country), corresponding to a different area code, in order to attend university. It is further assumed that, as a result of this move, the user $12_3$ acquires a new communication device $14_9$ which may be a wired POTS phone, a wireless phone, a VoIP phone, an ATA-equipped POTS phone, a softphone, a telephony-enabled television unit, or any other suitable communication device usable to effect telephonic communications.

In this case, upon acquiring the communication device $14_9$ the user $12_3$ acquires a new telephone number, which for purposes of this example is assumed to be (444) 555-3456, identifying the communication device $14_9$. The telephone number (444) 555-3456 may be given to friends or other contacts of the user $12_3$ which are in or around the city to which the user $12_3$ has moved, thus making it easier for these friends or other contacts to call the user $12_3$ without incurring long distance charges.

Figure 5:
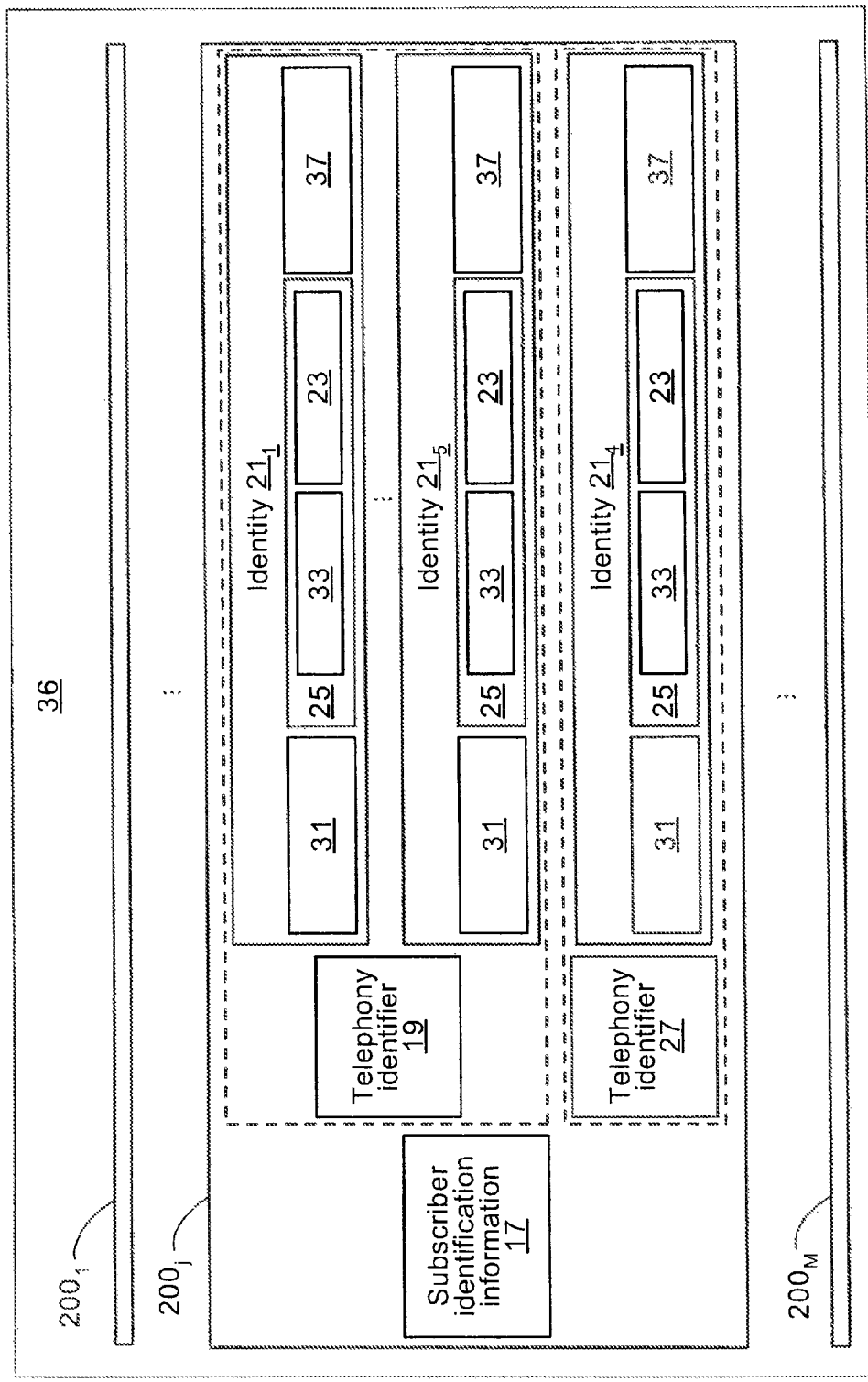
FIG. 5 shows a first example situation in which an additional telephony identifier is associated with one of the identities.

The user $12_3$ may then use the computing device 70 to access and interact with the data network site implemented by the computing element 72 in order to reflect availability of the telephone number (444) 555-3456 to which can be placed calls intended for the user $12_3$. For example, by using controls and functions provided by the data network site, the user $12_3$ may specify that the telephone number (444) 555-3456 is associated with the identity $21_4$ which designates the user $12_3$. This causes the computing element 72 (or another element of the call processing system 20) to create in the database 36 an association between the telephone number (444) 555-3456 and the identity $21_4$, as conceptually illustrated in FIG. 5 where the telephone number (444) 555-3456 is denoted by reference numeral 27.

With the telephone number (444) 555-3456 being associated with the identity $21_4$, the information associated with that identity, including the call processing information 25 and the contact information 37, is effectively linked to both the telephone number (555) 555-1234 and the telephone number (444) 555-3456. This provides several benefits.

For example, the user $12_3$ is reachable by placing a call to either the telephone number (555) 555-1234 or the telephone number (444) 555-3456. Thus, friends or other contacts of the user $12_3$ which are in or around the city to which the user $12_3$ has moved can reach the user $12_3$ by calling the telephone number (444) 555-3456 likely without incurring long distance charges, while friends or other contacts of the user $12_3$ which are in or around the residence 18 and its surrounding area where the user $12_3$ had been living can still reach the user $12_3$ by calling the telephone number (555) 555-1234.

As another example, the processing operation information 23 associated with the identity $21_4$, which specifies one or more operations to be performed by the call processing system 20 to process calls intended for or originated by that identity, is applied to the telephone number (444) 555-3456 without the user $12_3$ having to configure similar or identical processing operation information specifically for purposes of the telephone number (444) 555-3456. For instance, one or more routing rules defined by the processing operation information 23 associated with the identity $21_4$ and/or one or more telephony features subscribed to by the user $12_3$ are applied to calls placed to the telephone number (444) 555-3456 and/or originated using the communication device $14_9$ without the user $12_3$ having to go through a new provisioning phase specifically for the telephone number (444) 555-3456. It is noted that, in some cases, upon interacting with the data network site implemented by the computing element 72 in order to specify that the telephone number (444) 555-3456 is associated with the identity $21_4$, the user $12_3$ may modify the call processing information 25 associated with that identity in order to take into account his moving away (e.g., the user $12_3$ may modify the processing operation information 23 so that it indicates that any call placed to the telephone number (444) 555-3456 is to be routed first to the communication device $14_9$). Similarly, the contact information 37 associated with the identity $21_4$ is available to the user $12_3$, for instance, when using the communication device $14_9$ to originate an outgoing call, without the user $12_3$ having to provide this contact information once more.

As yet another example, since the telephone number (444) 555-3456 is linked to the record $200_j$, the subscriber associated with that record may be billed in a consolidated manner (e.g., by receiving a single bill) for charges incurred for communication services in relation to both the telephone number (555) 555-1234 and the telephone number (444) 555-3456, thereby simplifying the billing process from the subscriber's perspective. However, while in this embodiment the association between the telephone number (444) 555-3456 and the identity $21_4$ is maintained as part of the record $200_j$ of the database 36, in other embodiments, this association may be maintained as part of another one of the records $200_1 \ldots 200_M$ of the database 36.

While in this example situation the user 123 acquires the telephone number (444) 555-3456 upon acquiring the communication device $14_9$, it will be appreciated that in other example situations the user $12_3$ may acquire this telephone number without acquiring any new communication device. For instance, in some cases, the user $12_3$ may bring with him the communication device $14_7$ when moving away, in which case the user $12_3$ may, upon interacting with the data network site implemented by the computing element 72 to specify that the telephone number (444) 555-3456 is associated with the identity $21_4$, have calls placed to the telephone number (444) 555-3456 routed first to the communication device $14_7$.

Also, while in this example situation it is desired to associate the telephone number (444) 555-3456, in addition to the telephone number (555) 555-1234, with the identity $21_4$ due to the user $12_3$ moving away to a different city, it will be recognized that various other situations can arise where it may be desired or needed to associate an additional telephone number, in addition to the telephone number (555) 555-1234, to one or more of the identities $21_1 \ldots 21_5$ such that a party designated by each of these one or more identities is reachable by placing a call to either the telephone number (555) 555-1234 or the additional telephone number. For example, the family formed by the users $12_1 \ldots 12_4$ may have other family members (e.g., extended family members) living in a remote city (possibly in a remote country) corresponding to a different area code, in which case the family formed by the users $12_1 \ldots 12_4$ may desire to associate an additional telephone number, which is a local telephone number for the remote city, to one or more of the identities $21_1 \ldots 21_5$ in order to make it easier for these other family members to call the users $12_1 \ldots 12_4$ without incurring long distance charges. As another example, upon registering to associate the telephone number (555) 555-1234 to the group of identities $21_1 \ldots 21_5$, one or more of the users $12_1 \ldots 12_4$ may already have one or more original telephone numbers at which they could be reached (e.g., an original telephone number associated with the communication device $14_1$, an original telephone number associated with the communication device $14_2$, an original telephone number associated with the communication devices $14_3 \ldots 14_6$, etc.), in which case these one or more original telephone numbers may be associated, in addition to the telephone number (555) 555-1234, to one or more of the identities $21_1 \ldots 21_5$ such that callers calling these one or more original telephone numbers can still reach the one or more of the users $12_1 \ldots 12_4$.

Example 3

Associating an Additional Identity to a Telephone Number

As a third example, in some situations, it may be desired to associate an additional identity, in addition to the group of identities $21_1 \ldots 21_5$, with the telephone number (555) 555-1234 such that a party designated by the additional identity is reachable by placing a call to the telephone number (555) 555-1234.

For instance, FIG. 4 illustrates an example situation in which a user $12_5$ who, for purposes of this example, is assumed to be a grandmother of the users $12_3$ and $12_4$ (i.e., a mother of the user $12_1$ or the user $12_2$) is moving in with the family living at the residence 18. It is further assumed that, as a result of this move, the user $12_5$ is provided with a new communication device $14_{10}$, which, in this case, is a VoIP phone located in a bedroom of the residence 18 which has been set up for the user $12_5$. In other cases, the communication device $14_{10}$ may be a wired POTS phone, a wireless phone, an ATA-equipped POTS phone, a softphone, a telephony-enabled television unit, or any other suitable communication device usable to effect telephonic communications.

Figure 6:
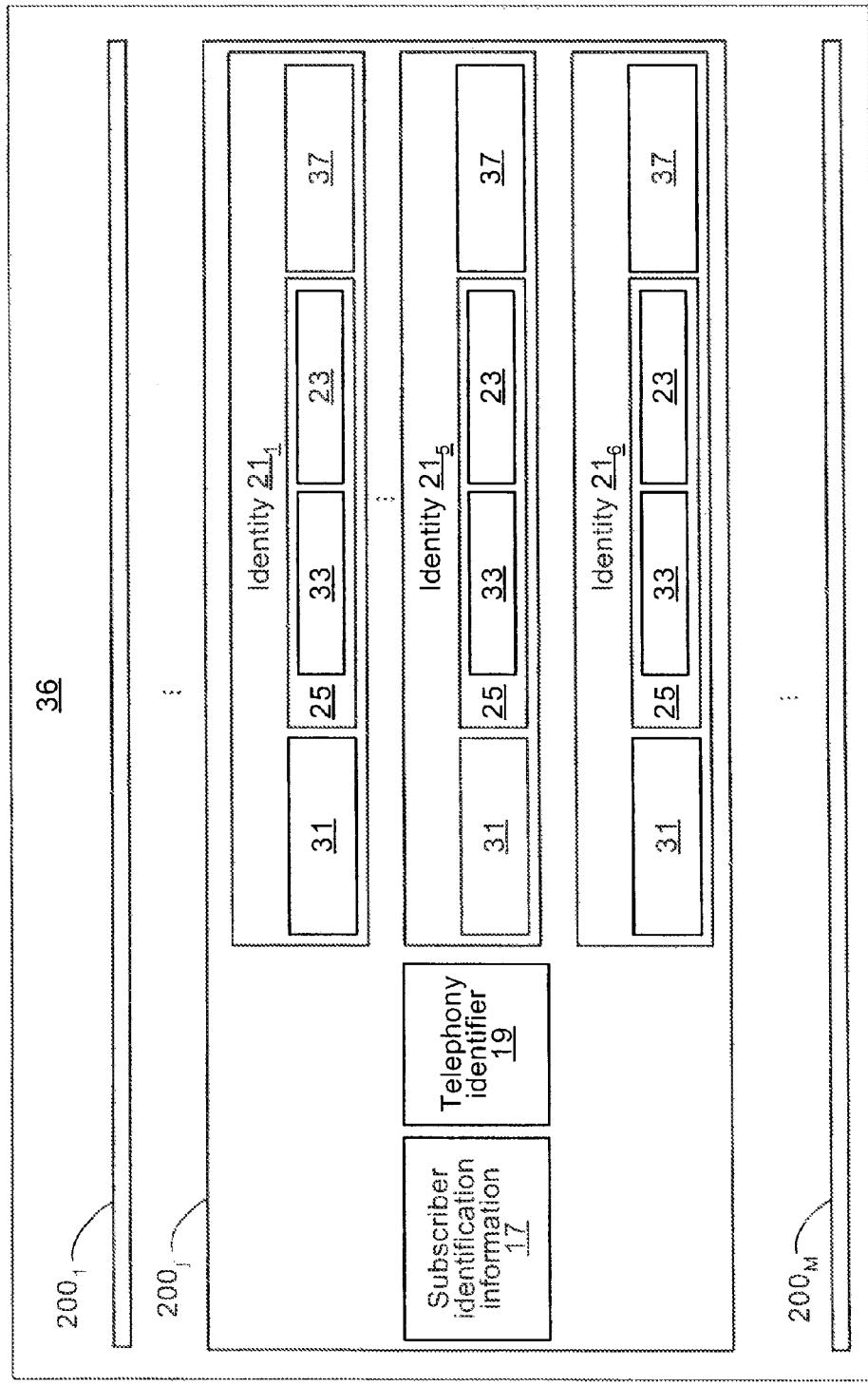
FIG. 6 shows a second example situation in which an additional identity is associated with the telephony identifier.

As the user $12_5$ is moving into the residence 18, it is desired to associate an additional identity, which designates the user $12_5$, with the telephone number (555) 555-1234 that is already associated with the group of identities $21_1 \ldots 21_5$. Accordingly, the user $12_5$ or one of the users $12_1 \ldots 12_4$ may use the computing device 70 to access and interact with the data network site implemented by the computing element 72 in order to associate an additional identity designating the user $12_5$ with the telephone number (555) 555-1234. For example, by using controls and functions provided by the data network site, the user $12_5$ or one of the users $12_1 \ldots 12_4$ may associate an additional identity designating the user $12_5$ with the telephone number (555) 555-1234. This causes the computing element 72 (or another element of the call processing system 20) to create in the database 36 an association between the telephone number (555) 555-1234 and an identity $21_6$ which designates the user $12_5$, as conceptually illustrated in FIG. 6.

In some cases, the identity $21_6$ may be a new identity created by the user $12_5$ or one of the users $12_1 \ldots 12_4$ while interacting with the data network site implemented by the computing element 72 using the computing device 70. For example, by using controls and functions provided by the data network site, the user $12_5$ or one of the users $12_1 \ldots 12_4$ may configure information associated with the identity $21_6$. More particularly, the user $12_5$ or one of the users $12_1 \ldots 12_4$ may interact with the data network site to: provide call processing information 25 associated with the identity $21_6$ (e.g., specify one or more routing operations to be performed for incoming calls intended for the user $12_5$, enable application of one or more telephony features to calls involving the user $12_5$, etc.); provide contact information 37 associated with the identity $21_6$ (e.g., add one or more contacts of the user $12_5$); and/or provide identity identification information 31 identifying the identity $21_6$ (e.g., specify a name or other identifier serving to identify that identity). For instance, in this example situation, the call processing information 25 associated with the identity $21_6$ may indicate that any call intended for that identity is to be first routed to the communication device $14_{10}$ (i.e., the VoIP phone in the grandmother's bedroom at the residence 18) and, if not answered within a certain period of time (e.g., a certain number of rings), then routed to the communication device $14_3$ (i.e., the VoIP phone located in the common area of the residence 18).

In other cases, the identity $21_6$ may be an already-existing identity designating the user $12_5$ that had been previously created for the user $12_5$ within the call processing system 20. For example, the user $12_5$ may already be a subscriber to communication services provided by the service provider operating the call processing system 20 and may have had the identity $21_6$ set up as part of an earlier provisioning phase with the service provider during which information associated with that identity (e.g., call processing information 25, contact information 37, and/or identity identification information 31 associated with that identity) had been configured. In such cases, while using the computing device 70 to interact with the data network site implemented by the computing element 72, the user $12_5$ or one of the users $12_1 \ldots 12_4$ may specify that the (already-existing) identity $21_6$ is to be associated with the telephone number (555) 555-1234. Also, in some situations, prior to being associated with the telephone number (555) 555-1234 as a result of the user $12_5$ moving into the residence 18, the (already-existing) identity $21_6$ may have been associated with an original telephone number of the user $12_5$. In these situations, while interacting with the data network site to specify that the (already-existing) identity $21_6$ is to be associated with the telephone number (555) 555-1234, the user $12_5$ or one of the users $12_1 \ldots 12_4$ may remove a previous association between the identity $21_6$ and the original telephone number of the user $12_5$ or may keep this previous association such that the user $12_5$ is reachable by placing a call to either the telephone number (555) 555-1234 or her original telephone number.

Thus, in this example situation where the user $12_5$ is moving in with the family living at the residence 18, the association of the identity $21_6$, in addition to the group of identities $21_1 \ldots 21_5$, with the telephone number (555) 555-1234 (either by creating the identity $21_6$ or by accessing it if it already exists) enables convenient and efficient handling of calls involving the user $12_5$ in her new living environment. Also, as the identity $21_6$ is associated with the telephone number (555) 555-1234 that is linked to the record $200_j$, the subscriber associated with that record may be billed in a consolidated manner (e.g., by receiving a single bill) for charges incurred for communication services used by the user $12_5$ as well as the users $12_1 \ldots 12_4$, thereby simplifying the billing process from the subscriber's perspective.

While in this example situation it is desired to associate the identity $21_6$, in addition to the group of identities $21_1 \ldots 21_5$, with the telephone number (555) 555-1234 due to the user $12_5$ moving in with the family formed by the users $12_1 \ldots 12_4$, it will be recognized that various other situations can arise where it may be desired or needed to associate an additional identity to the telephone number (555) 555-1234, in addition to the group of identities $21_1 \ldots 21_5$, such that a party designated by the additional identity is reachable by placing a call to the telephone number (555) 555-1234

It will thus be appreciated that, by interacting with the data network site implemented by the computing element 72, the users $12_1 \ldots 12_4$ (and/or other users such as the user $12_5$) can manage the identities $21_1 \ldots 21_5$ (and/or other identities such as the identity $21_6$) associated with the telephone number (555) 555-1234 (and/or one or more other telephone numbers such as the telephone number (444) 555-3456) in a flexible and convenient manner.

It will also be appreciated that, while in embodiments considered above the users $12_1 \ldots 12_4$ can manage the identities $21_1 \ldots 21_5$ by using the computing device 70 to access and interact with the data network site implemented by the computing element 72, in other embodiments, the users $12_1 \ldots 12_4$ may interact with the service provider operating the call processing system 20 in other ways in order to effect these management activities. For example, in some embodiments, one or more of the users $12_1 \ldots 12_4$ may interact in person, via phone or otherwise with a representative of the service provider in order to manage the identities $21_1 \ldots 21_5$.

Those skilled in the art will appreciate that, in some embodiments, certain functionality of a given element described herein (e.g., the processing element 24) may be implemented as pre-programmed hardware or firmware components (e.g., application specific integrated circuits (ASICs), electrically erasable programmable read-only memories (EEPROMs), etc.) or other related components. In other embodiments, a given element described herein (e.g. the processing element 24) may comprise a processor having access to a memory which stores program instructions for operation of the processor to implement functionality of that given element. The program instructions may be stored on a data storage medium that is fixed, tangible, and readable directly by the given element. The data storage medium may store data optically (e.g., an optical disk such as a CD-ROM or a DVD), magnetically (e.g., a hard disk drive, a removable diskette), electrically (e.g., semiconductor memory, floating-gate transistor memory, etc.), or in various other ways. Alternatively, the program instructions may be stored remotely but transmittable to the given element via a modem or other interface device connected to a network over a transmission medium. The transmission medium may be either a tangible medium (e.g., optical or analog communications lines) or a medium implemented using wireless techniques (e.g., microwave, infrared or other wireless transmission schemes).

Although various embodiments of the present invention have been described and illustrated, it will be apparent to those skilled in the art that numerous modifications and variations can be made without departing from the scope of the invention, which is defined in the appended claims.

The invention claimed is:

1. A system for processing calls, said system comprising:
a database including:
a plurality of telephony identifiers; and
for each telephony identifier, information regarding a group of identities that is associated with said telephony identifier, each identity of said group of identities designating a party reachable by placing a call to said telephony identifier, said information comprising, for each identity of said group of identities, information related to processing of calls involving said identity, wherein for each telephony identifier, the party designated by a first identity of the group of identities that is associated with said telephony identifier is a person and the party designated by a second identity of the group of identities that is associated with said telephony identifier is a plurality of persons; and
a processing element having access to said database and being operative for:
determining that a given call involves a particular identity of the group of identities that is associated with a given one of the telephony identifiers; and
processing the given call based on the information related to processing of calls involving the particular identity.

2. A system as claimed in claim 1, wherein, for each telephony identifier, the party designated by a first identity of the group of identities that is associated with said telephony identifier is a first person and the party designated by a second identity of the group of identities that is associated with said telephony identifier is a second person.

3. A system as claimed in claim 1, wherein, for each telephony identifier, the party designated by a first identity of the group of identities that is associated with said telephony identifier and the party designated by a second identity of the group of identities that is associated with said telephony identifier is a common person.

4. A system as claimed in claim 1, wherein each of the telephony identifiers is a telephone number.

5. A system as claimed in claim 1, wherein, for each telephony identifier and for each identity of said group of identities that is associated with said telephony identifier, the information related to processing of calls involving said identity further comprises information identifying a communication device associated with said identity.

6. A system as claimed in claim 5, wherein, for each telephony identifier and for each identity of said group of identities that is associated with said telephony identifier, the information identifying a communication device associated with said identity comprises a hidden identifier identifying said communication device.

7. A system as claimed in claim 1, wherein, for each telephony identifier and for each identity of said group of identities that is associated with said telephony identifier, the information indicative of at least one operation to perform to process calls intended for or originated by said identity further relates to at least one telephony feature.

8. A system as claimed in claim 7, wherein the at least one telephony feature includes at least one of a call forwarding feature, a selective call forwarding feature, a no-answer call forwarding feature, a find me/follow me call forwarding feature, a distinctive ringing feature, a selective call rejection feature, a selective call acceptance feature, a call waiting feature, a distinctive ringing call waiting feature, a calling line identification displaying feature, a calling line identification blocking feature, a speed calling feature, and an outgoing call barring feature.

9. A system as claimed in claim 1, wherein said database includes, for each telephony identifier and for each identity of said group of identities that is associated with said telephony identifier, contact information regarding at least one contact associated with said identity.

10. A system as claimed in claim 1, wherein said determining comprises determining that the given call is intended for the particular identity and said processing the given call comprises causing routing of the given call based on the information related to processing of calls involving the particular identity.

11. A system as claimed in claim 10, wherein the information related to processing of calls involving the particular identity further comprises information identifying a communication device associated with the particular identity, said causing routing comprising causing routing of the given call to the communication device.

12. A system as claimed in claim 10, wherein said processing element is operative for obtaining information regarding an origin of the given call, said determining comprising determining that the given call is intended for the particular identity based on the information regarding the origin of the given call.

13. A system as claimed in claim 12, wherein the database includes, for each identity of the group of identities that is associated with the given one of the telephony identifiers, contact information regarding at least one contact associated with said identity, wherein the information regarding the origin of the given call comprises at least one of (1) a certain telephony identifier associated with a communication device from which the given call originates and (2) an identifier of a calling party having originated the given call, and wherein said determining comprises concluding that at least one of the certain telephony identifier and the identifier of the calling party is included in the contact information regarding at least one contact associated with the particular identity.

14. A system as claimed in claim 12, wherein the given call is a current call and said determining comprises:
consulting a call history of previous calls; and
concluding from the call history and the information regarding the origin of the current call that the current call is intended for the particular identity.

15. A system as claimed in claim 14, wherein said concluding comprises determining from the call history that the particular identity has been involved in answering at least one previous call placed to the given one of the telephony identifiers and having an origin corresponding to the origin of the current call.

16. A system as claimed in claim 14, wherein said concluding comprises determining from the call history that the particular identity has been involved in placing at least one previous call to a destination corresponding to the origin of the current call.

17. A system as claimed in claim 12, wherein the information regarding the origin of the given call comprises at least one of (1) a certain telephony identifier associated with a communication device from which the given call originates and (2) an identifier of a calling party having originated the given call, said determining comprising:
performing a search on at least one site of a data network on a basis of at least one of the certain telephony identifier and the identifier of the calling party; and identifying, based on results of the search, a relationship between the particular identity and the origin of the given call.

18. A system as claimed in claim 17, wherein the at least one site comprises at least one of a social networking site and a search engine site.

19. A system as claimed in claim 1, wherein the information related to processing of calls involving the particular identity further comprises information identifying a communication device associated with the particular identity, said determining comprises determining that the given call is originated by the particular identity based on the communication device being used to originate the given call.

20. A system as claimed in claim 1, wherein said determining comprises determining that the given call is originated by the particular identity based on a signal produced by a communication device used to originate the given call.

21. A system as claimed in claim 20, wherein the signal conveys at least one dual-tone multi-frequency tone serving to identify the particular identity.

22. A system as claimed in claim 20, wherein the signal conveys at least one utterance spoken by the party designated by the particular identity when originating the given call.

23. A system as claimed in claim 22, wherein the at least one utterance specifies an identifier of the particular identity.

24. A system as claimed in claim 22, wherein the at least one utterance has voice characteristics corresponding to a voiceprint of the party designated by the particular identity.

25. A system as claimed in claim 20, wherein the signal is produced in response to the party designated by the particular identity pressing on at least one button of the communication device dedicated to identification of the particular identity.

26. A system as claimed in claim 1, wherein said determining comprises determining that the given call is originated by the particular identity and said processing the given call comprises causing presentation of information identifying the particular identity at a communication device receiving the given call.

27. A system as claimed in claim 1, wherein said determining comprises determining that the given call is originated by the particular identity and said processing the given call comprises enabling the party designated by the particular identity to use contact information regarding at least one contact associated with the particular identity in order to specify a destination of the given call.

28. A system as claimed in claim 1, wherein the information related to processing of calls involving the particular identity further comprises information regarding at least one telephony feature applicable to outgoing calls, and wherein said determining comprises determining that the given call is originated by the particular identity and said processing the given call comprises causing application of the at least one telephony feature applicable to outgoing calls.

29. A system as claimed in claim 28, wherein the at least one telephony feature applicable to outgoing calls includes at least one of: a speed calling feature, a caller line identification blocking feature, and an outgoing call barring feature.

30. A system as claimed in claim 1, wherein, for each telephony identifier and for each identity of said group of identifies that is associated with said telephony identifier, the information related to processing of calls involving said identity comprises information indicative of at least one operation to perform to process calls intended for or originated by said identity.

31. A system as claimed in claim 30, wherein, for each telephony identifier and for each identity of said group of identifies that is associated with said telephony identifier, the information indicative of at least one operation to perform process calls intended for or originated by said identity defines at least one call processing rule.

32. A method for processing calls, said method comprising:
maintaining a database including:
a plurality of telephony identifiers; and
for each telephony identifier, information regarding a group of identities that is associated with said telephony identifier, each identity of said group of identities designating a party reachable by placing a call to said telephony identifier, said information comprising, for each identity of said group of identities, information related to processing of calls involving said identity, wherein for each telephony identifier, the party designated by a first identity of the group of identities that is associated with said telephony identifier is a person and the party designated by a second identity of the group of identities that is associated with said telephony identifier is a plurality of persons;
determining that a given call involves a particular identity of the group of identities that is associated with a given one of the telephony identifiers; and
processing the given call based on the information related to processing of calls involving the particular identity.

33. A method as claimed in claim 32, wherein, for each telephony identifier, the party designated by a first identity of the group of identities that is associated with said telephony identifier is a first person and the party designated by a second identity of the group of identities that is associated with said telephony identifier is a second person.

34. A method as claimed in claim 32, wherein, for each telephony identifier, the party designated by a first identity of the group of identities that is associated with said telephony identifier and the party designated by a second identity of the group of identities that is associated with said telephony identifier is a common person.

35. A method as claimed in claim 32, wherein each of the telephony identifiers is a telephone number.

36. A method as claimed in claim 32, wherein, for each telephony identifier and for each identity of said group of identities that is associated with said telephony identifier, the information related to processing of calls involving said identity further comprises information identifying a communication device associated with said identity.

37. A method as claimed in claim 36, wherein, for each telephony identifier and for each identity of said group of identities that is associated with said telephony identifier, the information identifying a communication device associated with said identity comprises a hidden identifier identifying said communication device.

38. A method as claimed in claim 32, wherein, for each telephony identifier and for each identity of said group of identities that is associated with said telephony identifier, the information indicative of at least one operation to perform to process calls intended for or originated by said identity further relates to at least one telephony feature.

39. A method as claimed in claim 38, wherein the at least one telephony feature includes at least one of: a call forwarding feature, a selective call forwarding feature, a no-answer call forwarding feature, a find me/follow me call forwarding feature, a distinctive ringing feature, a selective call rejection feature, a selective call acceptance feature, a call waiting feature, a distinctive ringing call waiting feature, a calling line identification displaying feature, a calling line identification blocking feature, a speed calling feature, and an outgoing call barring feature.

40. A method as claimed in claim 32, wherein said database includes, for each telephony identifier and for each identity of said group of identities that is associated with said telephony identifier, contact information regarding at least one contact associated with said identity.

41. A method as claimed in claim 32, wherein said determining comprises determining that the given call is intended for the particular identity and said processing the given call comprises causing routing of the given call based on the information related to processing of calls involving the particular identity.

42. A method as claimed, in claim 41, wherein the information related to processing of calls involving the particular identity further comprises information identifying a communication device associated with the particular identity, said causing routing comprising causing routing of the given call to the communication device.

43. A method as claimed in claim 41, comprising obtaining information regarding an origin of the given call, said determining comprising determining that the given call is intended for the particular identity based on the information regarding the origin of the given call.

44. A method as claimed in claim 43, wherein the database includes, for each identity of the group of identities that is associated with the given one of the telephony identifiers, contact information regarding at least one contact associated with said identity, wherein the information regarding the origin of the given call comprises at least one of (1) a certain telephony identifier associated with a communication device from which the given call originates and (2) an identifier of a calling party having originated the given call, and wherein said determining comprises concluding that at least one of the certain telephony identifier and the identifier of the calling party is included in the contact information regarding at least one contact associated with the particular identity.

45. A method as claimed in claim 43, wherein the given call is a current call and said determining comprises:
consulting a call history of previous calls; and
concluding from the call history and the information regarding the origin of the current call that the current call is intended for the particular identity.

46. A method as claimed in claim 45, wherein said concluding comprises determining from the call history that the particular identity has been involved in answering at least one previous call placed to the given one of the telephony identifiers and having an origin corresponding to the origin of the current call.

47. A method as claimed in claim 45, wherein said concluding comprises determining from the call history that the particular identity has been involved in placing at least one previous call to a destination corresponding to the origin of the current call.

48. A method as claimed in claim 43, wherein the information regarding the origin of the given call comprises at least one of (1) a certain telephony identifier associated with a communication device from which the given call originates and (2) an identifier of a calling party having originated the given call, said determining comprising:
performing a search on at least one site of a data network on a basis of at least one of the certain telephony identifier and the identifier of the calling party; and
identifying, based on results of the search, a relationship between the particular identity and the origin of the given call.

49. A method as claimed in claim 48, wherein the at least one site comprises at least one of a social networking site and a search engine site.

50. A method as claimed in claim 32, wherein the information related to processing of calls involving the particular identity further comprises information identifying a communication device associated with the particular identity, said determining comprises determining that the given call is originated by the particular identity based on the communication device being used to originate the given call.

51. A method as claimed in claim 32, wherein said determining comprises determining that the given call is originated by the particular identity based on a signal produced by a communication device used to originate the given call.

52. A method as claimed in claim 51, wherein the signal conveys at least one dual-tone multi-frequency tone serving to identify the particular identity.

53. A method as claimed in claim 51, wherein the signal conveys at least one utterance spoken by the party designated by the particular identity when originating the given call.

54. A method as claimed in claim 53, wherein the at least one utterance specifies an identifier of the particular identity.

55. A method as claimed in claim 53, wherein the at least one utterance has voice characteristics corresponding to a voiceprint of the party designated by the particular identity.

56. A method as claimed in claim 51, wherein the signal is produced in response to the party designated by the particular identity pressing on at least one button of the communication device dedicated to identification of the particular identity.

57. A method as claimed in claim 32, wherein said determining comprises determining that the given call is originated by the particular identity and said processing the given call comprises causing presentation of information identifying the particular identity at a communication device receiving the given call.

58. A method as claimed in claim 32, wherein said determining comprises determining that the given call is originated by the particular identity and said processing the given call comprises enabling the party designated by the particular identity to use contact information regarding at least one contact associated with the particular identity in order to specify a destination of the given call.

59. A method as claimed in claim 32, wherein the information related to processing of calls involving the particular identity further comprises information regarding at least one telephony feature applicable to outgoing calls, and wherein said determining comprises determining that the given call is originated by the particular identity and said processing the given call comprises causing application of the at least one telephony feature applicable to outgoing calls.

60. A method as claimed in claim 59, wherein the at least one telephony feature applicable to outgoing calls includes at least one of: a speed calling feature, a caller line identification blocking feature, and an outgoing call barring feature.

61. A method as claimed in claim 32, wherein, for each telephony identifier and for each identity of said group of identifies that is associated with said telephony identifier, the information related to processing of calls involving said identity comprises information indicative of at least one operation to perform to process calls intended for or originated by said identity.

62. A method as claimed in claim 61, wherein, for each telephony identifier and for each identity of said group of identifies that is associated with said telephony identifier, the information indicative of at least one operation to perform process calls intended for or originated by said identity defines at least one call processing rule.

63. At least one non-transitory data storage medium storing a database for use in processing calls, said database including:
  a plurality of telephony identifiers; and
  for each telephony identifier, information regarding a group of identities that is associated with said telephony identifier, each identity of said group of identities designating a party reachable by placing a call to said telephony identifier, said information comprising, for each identity of said group of identities, information related to processing of calls involving said identity, wherein for each telephony identifier, the party designated by a first identity of the group of identities that is associated with said telephony identifier is a person and the party designated by a second identity of the group of identities that is associated with said telephony identifier is a plurality of persons.

64. A system for processing calls, said system comprising:
  a database including:
    a plurality of telephony identifiers; and
    for each telephony identifier, information regarding a group of identities that is associated with said telephony identifier, each identity of said group of identities designating a party reachable by placing a call to said telephony identifier, said information comprising, for each identity of said group of identities, information related to processing of calls involving said identity, wherein said information related to processing of calls involving said identity comprises a hidden identifier identifying a communication device associated with said identity;
  and
  a processing element having access to said database and being operative for:
    determining that a given call involves a particular identity of the group of identities that is associated with a given one of the telephony identifiers; and
    processing the given call based on the information related to processing of calls involving the particular identity.

65. A system as claimed in claim 64, wherein, for each telephony identifier, the party designated by a first identity of the group of identities that is associated with said telephony identifier is a first person and the party designated by a second identity of the group of identities that is associated with said telephony identifier is a second person.

66. A system as claimed in claim 64, wherein, for each telephony identifier, the party designated by a first identity of the group of identities that is associated with said telephony identifier and the party designated by a second identity of the group of identities that is associated with said telephony identifier is a common person.

67. A system as claimed in claim 64, wherein, for each telephony identifier, the party designated by a first identity of the group of identities that is associated with said telephony identifier is a person and the party designated by a second identity of the group of identities that is associated with said telephony identifier is a plurality of persons.

68. A system as claimed in claim 64, wherein each of the telephony identifiers is a telephone number.

69. A system as claimed in claim 64, wherein said determining comprises determining that the given call is originated by the particular identity based on a signal produced by a communication device used to originate the given call.

70. A system as claimed in claim 69, wherein the signal conveys at least one utterance spoken by the party designated by the particular identity when originating the given call.

71. A system as claimed in claim 70, wherein the at least one utterance specifies an identifier of the particular identity.

72. A system as claimed in claim 70, wherein the at least one utterance has voice characteristics corresponding to a voiceprint of the party designated by the particular identity.

73. A system as claimed in claim 64, wherein said determining comprises determining that the given call is originated by the particular identity and said processing the given call comprises enabling the party designated by the particular identity to use contact information regarding at least one contact associated with the particular identity in order to specify a destination of the given call.

74. A method for processing calls, said method comprising:
  maintaining a database including:
    a plurality of telephony identifiers; and
    for each telephony identifier, information regarding a group of identities that is associated with said telephony identifier, each identity of said group of identities designating a party reachable by placing a call to said telephony identifier, said information comprising, for each identity of said group of identities, information related to processing of calls involving said identity, wherein said information related to processing of calls involving said identity comprises a hidden identifier identifying a communication device associated with said identity;
  determining that a given call involves a particular identity of the group of identities that is associated with a given one of the telephony identifiers; and
  processing the given call based on the information related to processing of calls involving the particular identity.

75. A method as claimed in claim 74, wherein said determining comprises determining that the given call is intended for the particular identity and said processing the given call comprises causing routing of the given call based on the information related to processing of calls involving the particular identity.

76. A method as claimed in claim 75, comprising obtaining information regarding an origin of the given call, said determining comprising determining that the given call is intended for the particular identity based on the information regarding the origin of the given call.

77. A method as claimed in claim 76, wherein the database includes, for each identity of the group of identities that is associated with the given one of the telephony identifiers, contact information regarding at least one contact associated with said identity, wherein the information regarding the origin of the given call comprises at least one of (1) a certain telephony identifier associated with a communication device from which the given call originates and (2) an identifier of a calling party having originated the given call, and wherein said determining comprises concluding that at least one of the certain telephony identifier and the identifier of the calling party is included in the contact information regarding at least one contact associated with the particular identity.

78. A method as claimed in claim 76, wherein the given call is a current call and said determining comprises:
  consulting a call history of previous calls; and
  concluding from the call history and the information regarding the origin of the current call that the current call is intended for the particular identity.

79. A method as claimed in claim 78, wherein said concluding comprises determining from the call history that the particular identity has been involved in answering at least one previous call placed to the given one of the telephony identifiers and having an origin corresponding to the origin of the current call.

80. A method as claimed in claim 78, wherein said concluding comprises determining from the call history that the particular identity has been involved in placing at least one previous call to a destination corresponding to the origin of the current call.

81. A method as claimed in claim 76, wherein the information regarding the origin of the given call comprises at least one of (1) a certain telephony identifier associated with a communication device from which the given call originates and (2) an identifier of a calling party having originated the given call, said determining comprising:
- performing a search on at least one site of a data network on a basis of at least one of the certain telephony identifier and the identifier of the calling party; and
- identifying, based on results of the search, a relationship between the particular identity and the origin of the given call.

82. A method as claimed in claim 81, wherein the at least one site comprises at least one of a social networking site and a search engine site,

* * * * *